(12) United States Patent
Baumgartner et al.

(10) Patent No.: US 10,274,106 B2
(45) Date of Patent: Apr. 30, 2019

(54) PULLHEAD DEVICE AND METHOD OF USE

(71) Applicant: Ellingson Companies, West Concord, MN (US)

(72) Inventors: Clinton J. Baumgartner, Kenyon, MN (US); Jason M. Gillard, Kasson, MN (US); Nick P. Skogen, Dodge Center, MN (US); Russell H. Hilsman, Mantorville, MN (US); Travis J. Baumgartner, West Concord, MN (US); Jeremy R. Ellingson, West Concord, MN (US)

(73) Assignee: QuickConnect LLC, West Concord, MN (US)

( * ) Notice: Subject to any disclaimer, the term of this patent is extended or adjusted under 35 U.S.C. 154(b) by 0 days.

(21) Appl. No.: 15/693,006

(22) Filed: Aug. 31, 2017

(65) Prior Publication Data

US 2018/0058607 A1     Mar. 1, 2018

Related U.S. Application Data

(60) Provisional application No. 62/381,970, filed on Aug. 31, 2016.

(51) Int. Cl.
*F16L 1/032* (2006.01)
*E21B 7/00* (2006.01)
*F16L 1/06* (2006.01)

(52) U.S. Cl.
CPC ............. *F16L 1/032* (2013.01); *E21B 7/00* (2013.01); *F16L 1/06* (2013.01)

(58) Field of Classification Search
CPC . F16L 1/032; F16L 1/028; F16L 55/30; F16L 2101/50
See application file for complete search history.

(56) References Cited

U.S. PATENT DOCUMENTS

| 4,006,521 A | 2/1977 | Pedone |
| 4,101,114 A | 7/1978 | Martin et al. |

(Continued)

FOREIGN PATENT DOCUMENTS

| DE | 102015006501 A1 | 5/2015 |
| EP | 0957549 A1 | 11/1999 |

(Continued)

OTHER PUBLICATIONS

US 9,664,305 B1, 05/2017, Ziola et al. (withdrawn)

(Continued)

*Primary Examiner* — Sean D Andrish
(74) *Attorney, Agent, or Firm* — Merchant & Gould P.C.

(57) ABSTRACT

A pullhead includes a housing that has a first end and a second end. The housing is separable between a first body and a second body. The first and second bodies are pivotally coupled at a joint and the first and second bodies together define an interior pocket of the housing. The interior pocket has an interior pocket width. The pullhead head includes a pulling feature at the first end. The interior pocket includes an interior retainer flange that has an inner width and is disposed within the interior pocket. The inner width is less than the interior pocket width. The first body and second body are pivotable relative to each other around an axis at the joint that is transverse to a pulling direction.

22 Claims, 38 Drawing Sheets

(56) References Cited

U.S. PATENT DOCUMENTS

| | | |
|---|---|---|
| 4,318,639 A | 3/1982 | Schosek |
| 4,453,603 A | 6/1984 | Voss et al. |
| 4,460,159 A | 7/1984 | Charlebois et al. |
| 4,507,019 A | 3/1985 | Thompson |
| 4,563,032 A | 1/1986 | Knowles |
| 4,634,313 A | 1/1987 | Robbins |
| 4,637,756 A | 1/1987 | Boles |
| 4,684,161 A | 8/1987 | Egner et al. |
| 4,684,211 A | 8/1987 | Weber |
| 4,691,988 A | 9/1987 | Tremblay et al. |
| 4,969,677 A | 11/1990 | Melegari |
| 5,013,125 A | 5/1991 | Nilsson et al. |
| 5,122,007 A | 6/1992 | Smith |
| 5,173,009 A | 12/1992 | Moriarty |
| 5,211,429 A | 5/1993 | Chanson et al. |
| 5,642,912 A | 7/1997 | Parish, II |
| 5,651,639 A | 7/1997 | Wentworth et al. |
| 5,697,768 A | 12/1997 | Mills |
| 5,884,384 A | 3/1999 | Griffioen |
| 6,109,832 A | 8/2000 | Lincoln |
| 6,148,864 A | 11/2000 | Pascoe |
| 6,266,469 B1 | 7/2001 | Roth |
| 6,499,511 B2 | 12/2002 | Brewis |
| 6,499,912 B2 | 12/2002 | Coon |
| 6,637,969 B2 | 10/2003 | Crane et al. |
| 6,641,331 B2 | 11/2003 | Van Bijsterveld |
| 6,644,887 B2 | 11/2003 | Hesse |
| 6,682,264 B1 | 1/2004 | McGillis |
| 6,979,776 B1 | 12/2005 | Zimmerman |
| 7,086,808 B2 | 8/2006 | Wentworth |
| 7,270,500 B1 | 9/2007 | Ammons et al. |
| 7,985,037 B2 | 7/2011 | Duggan |
| 8,385,712 B2 | 2/2013 | Ahmed |
| 8,412,017 B2 | 4/2013 | Kowalczyk et al. |
| 8,757,594 B2 | 6/2014 | Jordan et al. |
| 8,800,967 B2 | 8/2014 | Carlson et al. |
| 8,831,395 B2 | 9/2014 | Sievers et al. |
| 8,870,162 B2 | 10/2014 | Allen |
| 9,027,908 B1 | 5/2015 | Calhoun et al. |
| 9,136,679 B1 | 9/2015 | Gretz |
| 9,297,716 B2 | 3/2016 | Bowie |
| 9,719,611 B1 * | 8/2017 | Ziola .................. F16L 1/00 |
| 2002/0081154 A1 | 6/2002 | Herrick et al. |
| 2003/0165360 A1 | 9/2003 | Wentworth et al. |
| 2004/0007700 A1 | 1/2004 | Hazel |
| 2005/0179014 A1 | 8/2005 | Diggle, III et al. |
| 2005/0201834 A1 | 9/2005 | Lafontaine |
| 2005/0241213 A1 | 11/2005 | Garber |
| 2007/0053749 A1 | 3/2007 | Jarvis et al. |
| 2007/0212169 A1 | 9/2007 | Crane |
| 2008/0286051 A1 | 11/2008 | Duggan |
| 2009/0056122 A1 | 3/2009 | Allen |
| 2010/0086345 A1 | 4/2010 | Dale |
| 2013/0315672 A1 | 11/2013 | Pajak et al. |
| 2015/0053295 A1 | 2/2015 | Elzink |
| 2015/0233183 A1 | 8/2015 | Melsheimer |

FOREIGN PATENT DOCUMENTS

| | | |
|---|---|---|
| EP | 1303896 A1 | 4/2003 |
| EP | 2725668 A1 | 4/2014 |

OTHER PUBLICATIONS

Georg Fisher Central Plastics, "Ductile Iron Mechanical Joint Anchor Fittings, MJ Adapter Design Information," Dec. 28, 2015, 9 pgs.

International Search Report and Written Opinion for PCT/US2017/014868, dated Apr. 17, 2017, 11 pgs.

Complaint filed in Case 0:17-cv-05269 (*Borehead, LLC* vs *Ellingson Draining, Inc. d/b/a Ellingson Companies, and Quickconnect LLC*), United States District Court for the District of Minnesota, filed Nov. 29, 2017, 59 pgs.

www.tekflow.fr/special-solutions/, Tekflow.fr. Jul. 2, 2013; Internet Archive https://web.archive.org/web/20130702035748/http://www.tekflow.fr/special-solutions/; Oct. 23, 2017, 2 pgs.

POLY-CAM, "Series 650, The POLY-CAM Pulling Head," Product Information, Nov. 2000, 3 pgs.

POLY-CAM, "Series 657 The Aquatherm Pulling Head," Product Information, Mar. 2010 (3 pgs).

POLY-CAM, "Series 656 The POLY-CAM C-900 Pulling Head (Diamond-Loc/Eagle-Loc," Product Information, Mar. 2010 (1 pg).

POLY-CAM, "Series 654F, The POLY-CAM Female CERTA-LOK Pulling Head," Product Information, Mar. 2010 (3 pgs).

POLY-CAM, "Series 653F, The POLY-CAM Female Yelomine Pulling Head," Product Information, Mar. 10 (3 pgs).

POLY-CAM, "Series 652, The POLY-CAM Multi Eye Pulling Head," Product Information, Nov. 2000 (1 pg).

POLY-CAM, "Series 651, The POLY-CAM Pulling Head DIPS," Product Information, Nov. 2000 (3 pgs).

Freudenberg Oil & Gas Technologies, "Vector Slimlok clamps," Product Information, 2014 (2 pgs).

American, "Flex-Ring Pulling Head" product information, Oct. 19, 2011, obtained from http://www.american-usa.com:80/products/ductile-iron-pipe-and-fittings/joint-accessories/flex-ring-pulling-head (1 pg).

American, "Flex-Ring Joint Pipe" Product Information, Oct. 6, 2011, obtained from http://www.american-usa.com:80/products/ductile-iron-pipe-and-fittings/restrained joint-pipe/flex-ring joint-pipe (2 pgs).

* cited by examiner

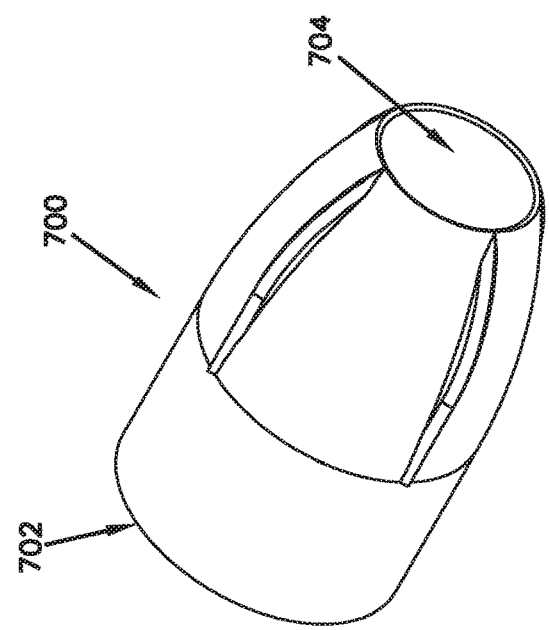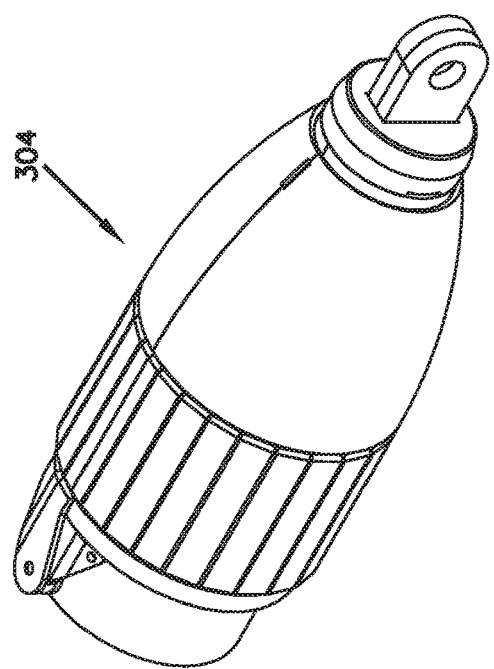
FIG. 34

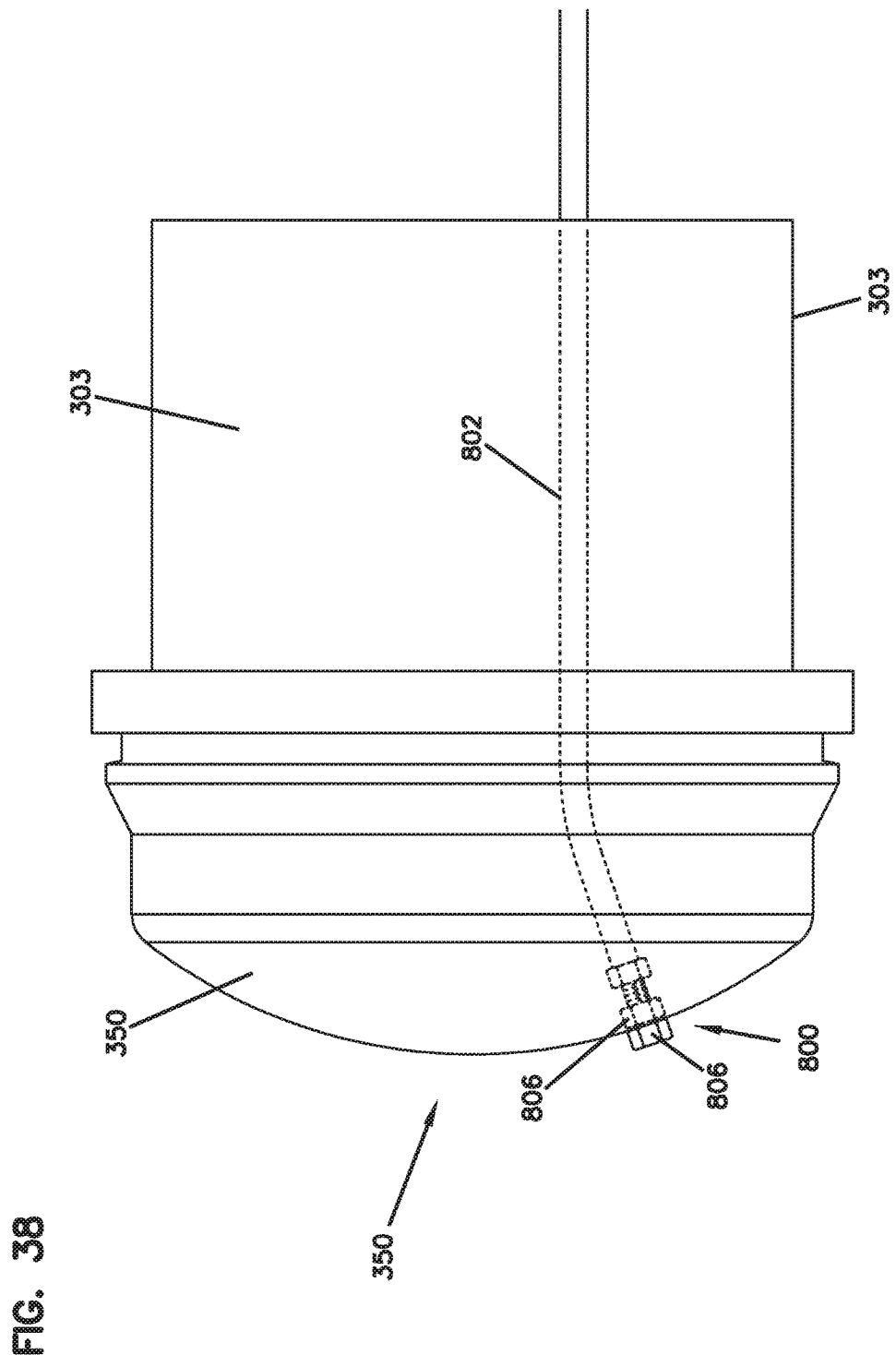

PULLHEAD DEVICE AND METHOD OF USE

CROSS-REFERENCE TO RELATED APPLICATION

The present application claims the benefit of U.S. Provisional Patent Application Ser. No. 62/381,970, filed Aug. 31, 2016, which application is hereby incorporated by reference in its entirety.

BACKGROUND

Product pipe, such as conduit, is often installed underground for accommodating underground utilities, such as fiber-optic cables. To install underground pipe (e.g., water, sewer, gas, etc.), a variety of different methods can be used. One example is Horizontal Directional Drilling ("HDD"), in which a pilot hole is drilled in the ground on a general horizontal path by an HDD machine. Once the pilot hole is complete, the product pipe is connected to the drill pipes and pulled back through the pilot hole.

Another technique called pipe bursting is also utilized for installing underground product pipe. In pipe bursting, an expander head is pulled through a preexisting underground pipe so as to expand and burst the preexisting pipe as it is pulled underground by way of a pulling machine (such as a winch). As the expander head bursts the preexisting pipe, the expander head pulls a new product pipe, which is attached at the rear of the expander head, into the previous location of the preexisting pipe.

Often, in order to attach the product pipe to the drill string in an HDD operation or to the expander head in a pipe burst operation, a pullhead adapter is fused to the product pipe (e.g., welded, adhered, or placed within), attached to the drill string or expander head, and pulled into place underground. Once in place, the portion of pipe that includes the pullhead adapter is cut from the product pipe and a pipe adapter must then be fused on the product pipe so that the product pipe can connect to other piping. The pipe adapter is often configured to join dissimilar pipe materials together such as iron and high density polyethylene ("HDPE") in a mechanical joint ("MJ"). Such an adapter is often referred to as an MJ adapter. This removal of a portion of the product pipe and pullhead adapter and installation of the MJ adapter is often done in a drilling pit and can be both cumbersome and time consuming.

Therefore, improvements in pullhead adapters are desired.

SUMMARY

The present disclosure relates generally to a pullhead adapter. In one possible configuration, and by non-limiting example, a method for using a removable two-part pullhead is disclosed.

In one example of the present disclosure, a pullhead is disclosed. The pullhead includes a housing that has a first end and a second end. The housing is separable between a first body and a second body. The first and second bodies are pivotally coupled at a joint and the first and second bodies together define an interior pocket of the housing. The interior pocket has an interior pocket width. The pullhead head includes a pulling feature at the first end. The interior pocket includes an interior retainer flange that has an inner width and is disposed within the interior pocket. The inner width is less than the interior pocket width. The first body and second body are pivotable relative to each other around an axis at the joint that is transverse to a pulling direction.

In another example of the present disclosure, a method for installing a pullhead at an end of a conduit is disclosed. The method includes attaching an adapter to the end of the conduit. The adapter includes a flange. The method includes installing a removable pullhead around the adapter. The pullhead includes a housing that has a first end and a second end. The housing is separable between a first body and a second body. The first and second bodies are pivotally coupled at a joint, and the first and second bodies together define an interior pocket of the housing. The interior pocket has an interior pocket width. The pullhead includes a pulling feature at the first end. The interior pocket includes an interior retainer flange that has an inner width and is disposed within the interior pocket. The inner width is less than the interior pocket width. The interior retainer flange corresponds with the flange on the adapter so as to allow the pullhead to pull the conduit in an axial direction via the pullhead.

In another example of the present disclosure, a pulling adapter is disclosed. The pulling adapter includes a housing that has a first and a second end. The housing is longitudinally separable between a first body and a second body. The first and second bodies are pivotally coupled at a joint, and the first and second bodies together define an interior pocket of the housing. The interior pocket has an interior pocket width. The pulling adapter includes a pulling eye positioned at the first end of the housing. The pulling adapter includes an opening that is positioned at the second end of the housing. The opening is in communication with the interior pocket and the joint is positioned adjacent the opening. The pulling adapter includes an interior retainer flange that is disposed within the interior pocket. The interior flange has an inner width that is less than the interior pocket width. The first and second bodies are pivotable about the joint between an open position and a closed position. When in the open position, the adapter is configured to receive a portion of conduit in the interior pocket. When in the closed position, the adapter is configured to retain a portion of conduit within the interior pocket for a pulling operation.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 34 illustrates a perspective view of the pipe bursting sleeve of FIG. 34 separated from the pullhead adapter of FIG. 18;

FIG. 38 illustrates a schematic side view of the pullback fluid fitting of FIG. 37 positioned within another pullhead accessory, according to one embodiment of the present disclosure.

DETAILED DESCRIPTION

Figure 1:
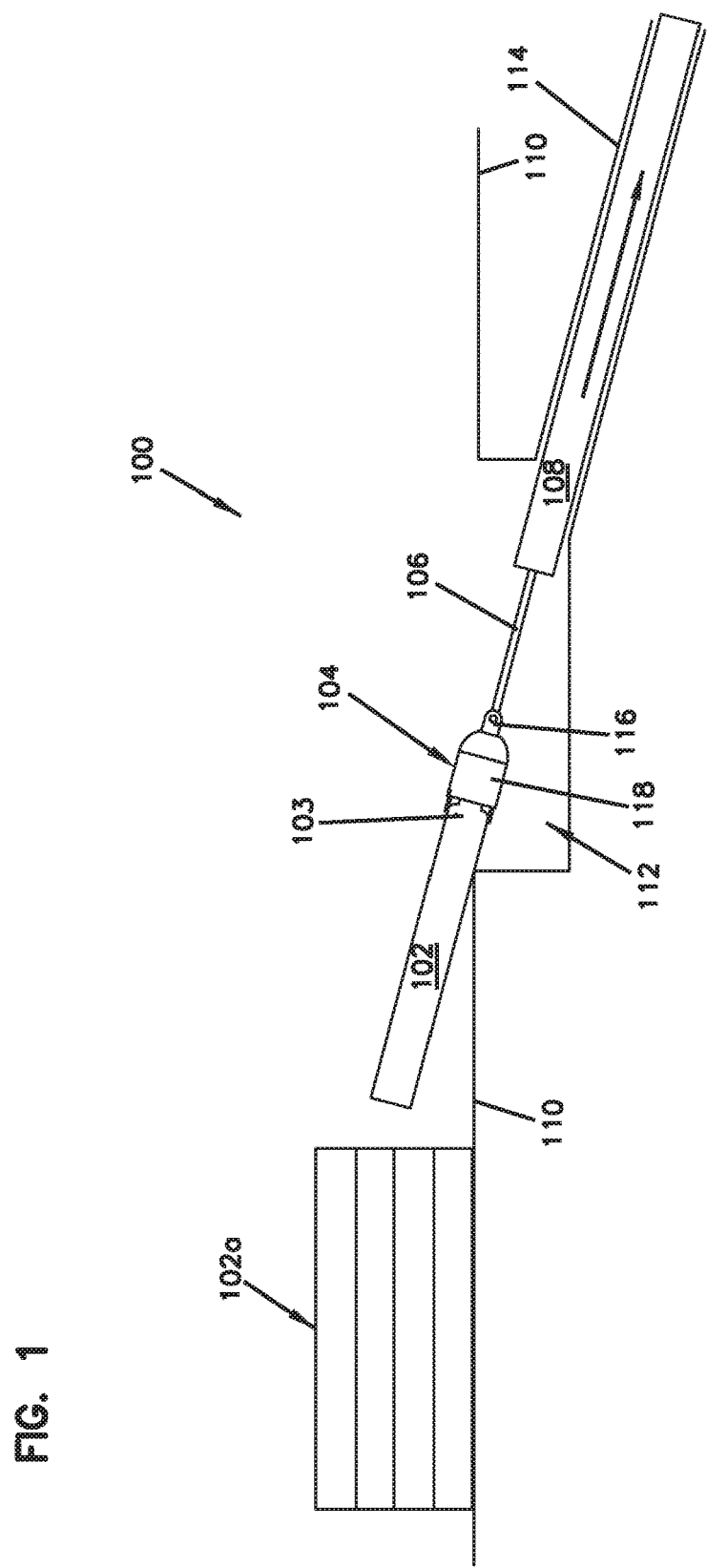
FIG. 1 illustrates a perspective view of a pullback system, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The pullhead device and associated method disclosed herein has several advantages. The removable pullhead can be attached to a product pipe quickly, the pulling operation completed, and the pullhead quickly removed. This offers both time and labor savings, thereby increasing the overall efficiency of the work completed at the job site. Specifically, the pullhead can be attached to a product to be pulled, with the attachment occurring without the use of fasteners. This improves the reliability of the pullhead as there is no fastener to loosen, leading to the potential failure of the pullhead, and no fastener to lose by those operating the pullhead. In some examples herein, the pullhead uses a joint that is positioned transverse to the pulling direction of the pullhead, and a locking device to keep the pullhead in a closed, secured position around the product to be pulled.

A pullback system 100 is shown in FIG. 1. The system 100 includes product pipe 102 (i.e., conduit), a pullhead 104, a pulling cable 106, and a drill string 108. The pullback system 100 is shown positioned at least partially under a ground surface 110. Specifically, the system 100 is shown in a staging scenario within an exit drilling pit 112 before a pulling operation. The pullback system 100 is configured to pull and install the product pipe 102 underground into a hole 114.

The product pipe 102 can be an HDPE pipe or other like pipe. In some embodiments, the product pipe is a polyvinyl chloride pipe, fusible polyvinyl chloride pipe, or other similar material. In other embodiments still, the product pipe 102 can be constructed from metal such a ductile iron. In some embodiments, the product pipe 102 can be a plurality of pipes such as a bundle of pipes. The pipe 102 can be of a variety of different diameters and lengths. In some embodiments, the pipe 102 can be used for a variety of different applications such as for potable water, wastewater, chemicals, cables, etc. In some embodiments, the product pipe 102 can include sections 102a that are joined together for installation underground. Further, in some embodiments, the product pipe 102 can include an adapter 103 (shown in FIGS. 2-7) attached thereto. The adapter 103 is configured to aid in connecting the product pipe 102 to other conduit or joints.

The pullhead 104 is a pulling adapter that is attached to the product pipe (i.e., conduit) 102 and the pulling cable 106. In some embodiments, the pullhead 104 is secured around the adapter 103. The pullhead 104 includes a pulling eye 116 and a housing 118. The housing includes a first end 115 and a second end 117. The housing 118 is positioned around and secured to the product pipe 102, and the pulling eye 116 is connected to the pulling cable 106. The pullhead 104 is not permanently connected to the product pipe 102 and can be readily removed without cutting the product pipe 102. In some examples, the pullhead 104 can be installed and uninstalled without the use of fasteners to attach the pullhead to the product pipe 102.

The pulling cable 106 is connected to the pulling eye 116 of the pullhead 104 and to a pulling machine (not shown). The pulling cable 106 can be a steel cable or other similar material. The pulling machine is configured to exert a pulling force on the pulling cable 106 so as to pull the product pipe 102 into the hole 114 (shown in FIG. 1 by an arrow). In the depicted embodiment, the pulling cable 106 is attached to the drill string 108. The drill string 108 can be part of an HDD operation or a pipe bursting operation. In other embodiments, the pulling cable 106 is connected to an expander head in a pipe bursting application. In other embodiments still, a line pulling swivel (not shown) can be used between the pullhead 104 and the drill string 108, along the pulling cable 106. The swivel would prevent unwanted torsion from building up on the product pipe 102 during installation. In other embodiments, a reamer (not shown) can be attached between the drill string 108 and the pullhead 104. The reamer can be configured to increase the diameter of the hole 114 during a pullback operation.

Figure 2:
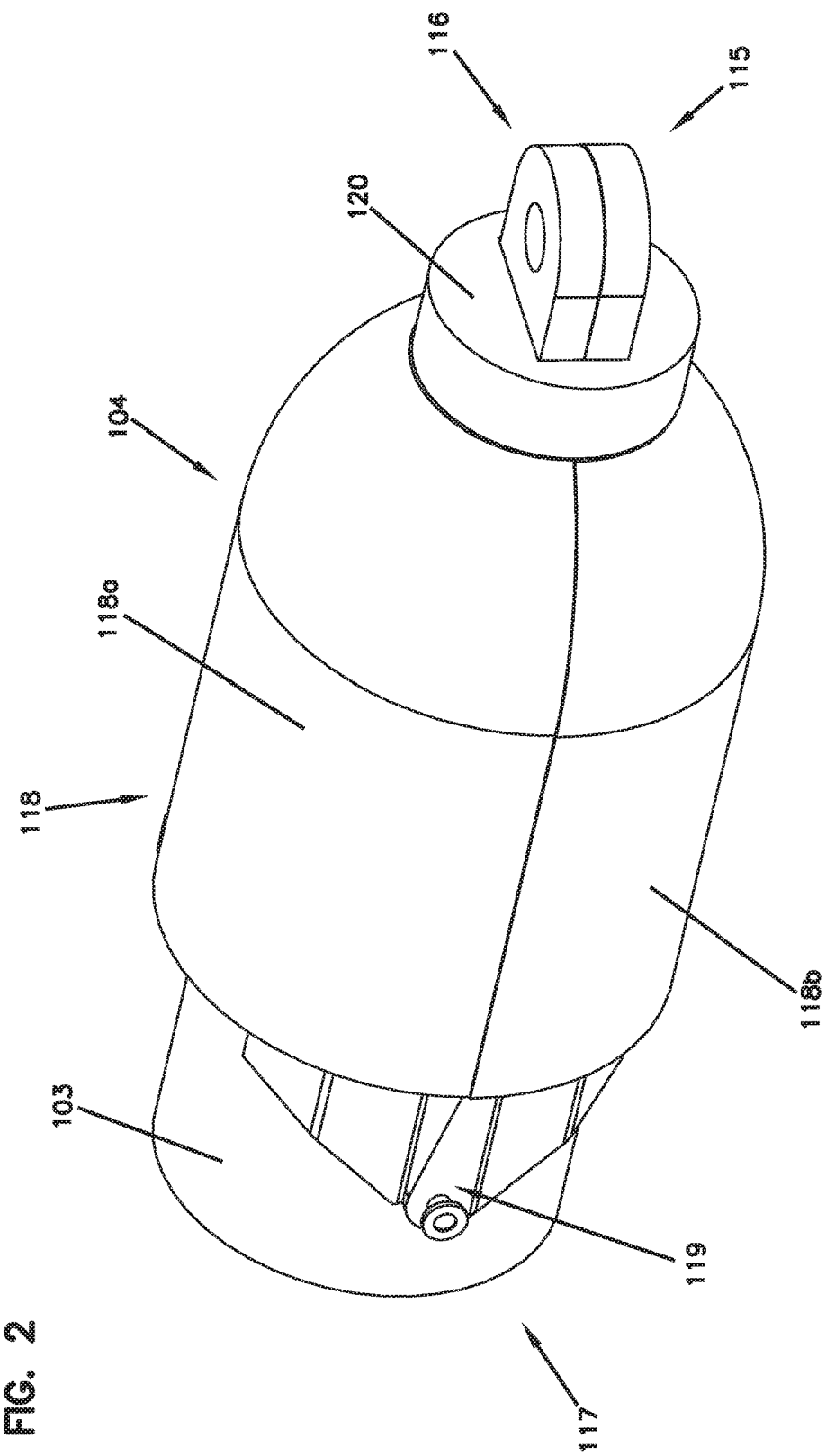
FIG. 2 illustrates a perspective view of a pullhead adapter in a closed position, according to one embodiment of the present disclosure.
Figure 3:
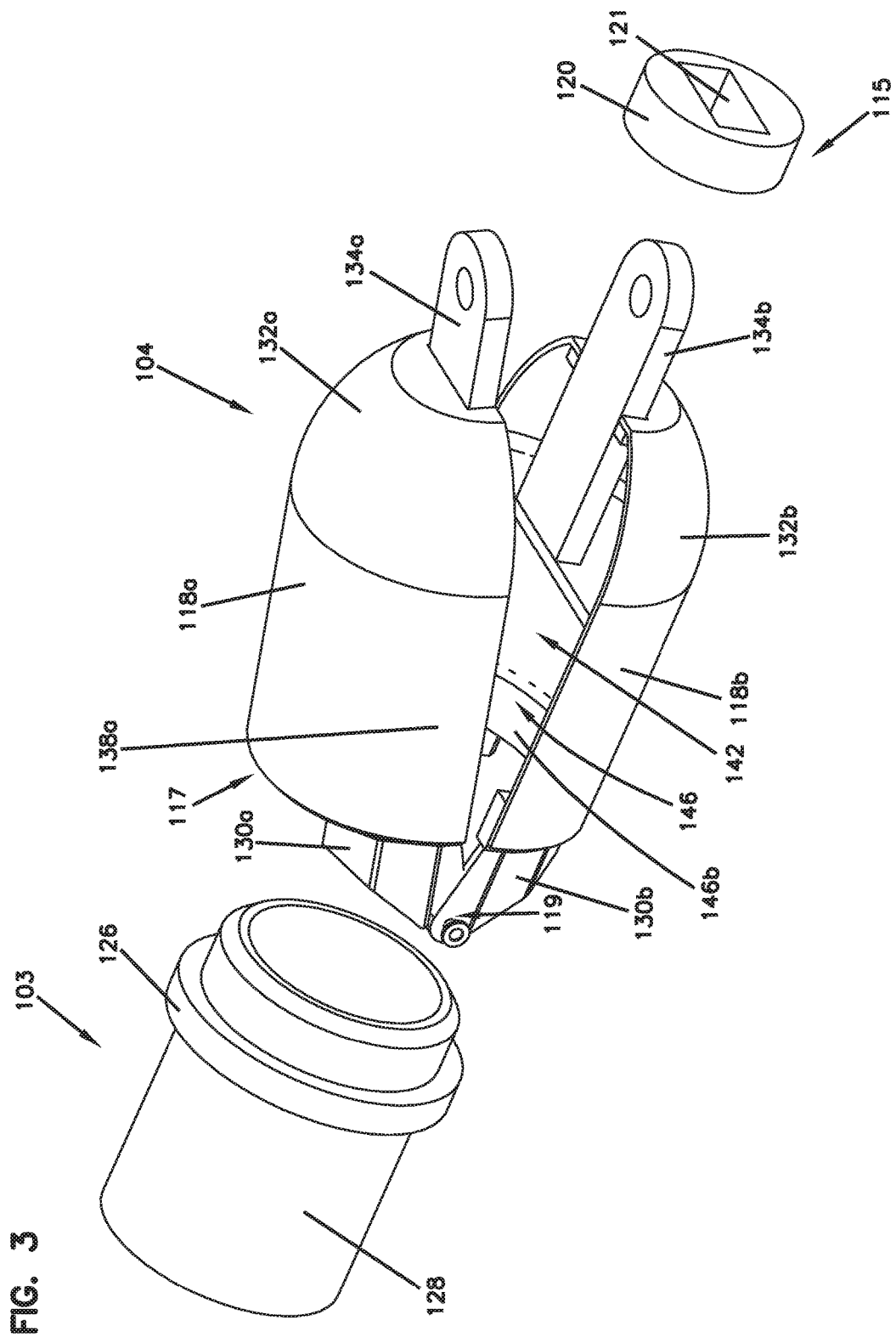
FIG. 3 illustrates a perspective view of the pullhead adapter of FIG. 2 in an open position.
Figure 4:
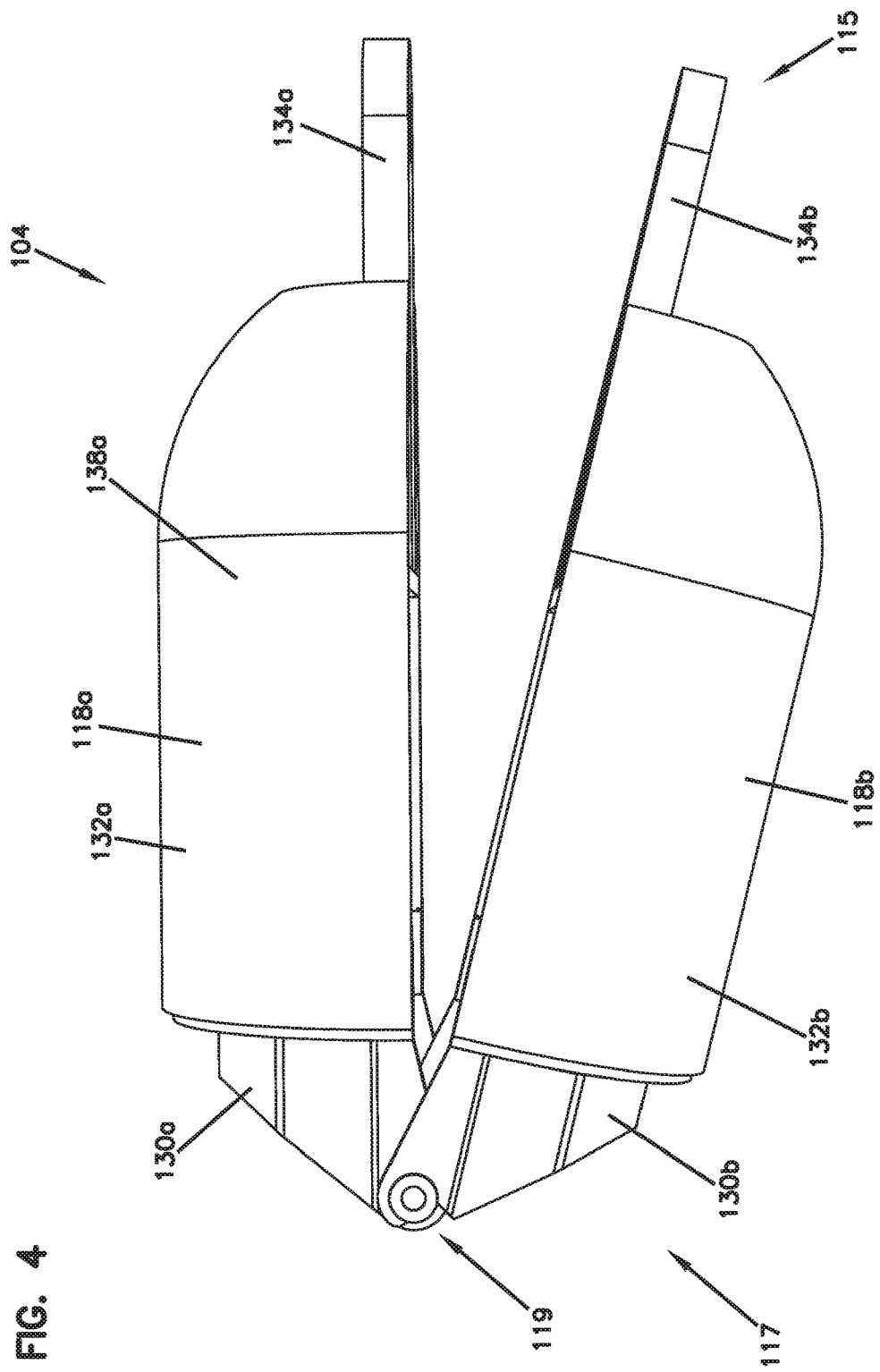
FIG. 4 illustrates a side view of the pullhead adapter of FIG. 2 in the open position.

FIG. 2 shows the pullhead 104 installed in a closed position over the adapter 103. FIGS. 3-4 show the pullhead 104 in an open and non-installed position. The pullhead 104 includes the pulling eye 116, the housing 118, a joint 119, and a retainer ring 120. Specifically, the housing 118 has a longitudinal axis L and is longitudinally separable and includes a first body 118a and a substantially similar second body 118b. In some examples, the pulling eye is a pulling feature. For example, the pulling feature can be, but not limited to, a hook, a hole, a recess, or other like structure that is configured to receive a pull back device such as a cable, clevis, fastener, or collar.

The adapter 103 can be an MJ adapter. In some embodiments, the adapter 103 is constructed of HDPE. The adapter 103 is configured to be fit over the product pipe 102 and be permanently fused to the product pipe 102 by soldering, gluing, or other similar means. The adapter 103 includes an inner width that is larger than that of the product pipe 102. Further, the adapter 103 includes a flange 126 positioned on an outer surface 128 of the adapter 103. The flange 126 has an outer diameter that is larger than the diameter of the outer surface 128. In some embodiments, the flange 126 is configured to aid in making a mechanical joint with another conduit portion.

The first and second bodies 118a, 118b are connectable at the joint 119. In some embodiments, the first and second bodies 118a, 118b are pivotable about the joint 119 having an axis H thereby forming a hinge. Each of the first and second bodies 118a, 118b include a joint extension 130a, 130b, a main shell 132a, 132b, and a pulling eye extension 134a, 134b. In some examples, the first and second bodies 118a, 118b are separable from one another and selectively coupled to one another via the joint 119.

In some examples, to lock the bodies 118a, 118b together with one another, the retainer ring 120 is positioned over the pulling eye 116, specifically over the pulling eye extensions 134a, 134b. The retainer ring 120 includes a through hole 121 that is configured to receive the pulling eye extensions 134a, 134b when they are mated together when the pullhead 104 is in the closed position (as shown in FIG. 2). Once installed over the pulling eye extensions 134a, 134b, the retainer ring 120 keeps the pulling eye extensions 134a, 134b from separating, which thereby keeps the first and second bodies 118a, 118b from separating. This keeps the pullhead secured to the adapter 103 in the closed position. In other embodiments, the pulling cable is secured directly to each pulling eye extension 134a, 134b thereby preventing the first and second bodies 118a, 118b from separating and the retaining the pullhead 104 in a closed position.

Figure 5:
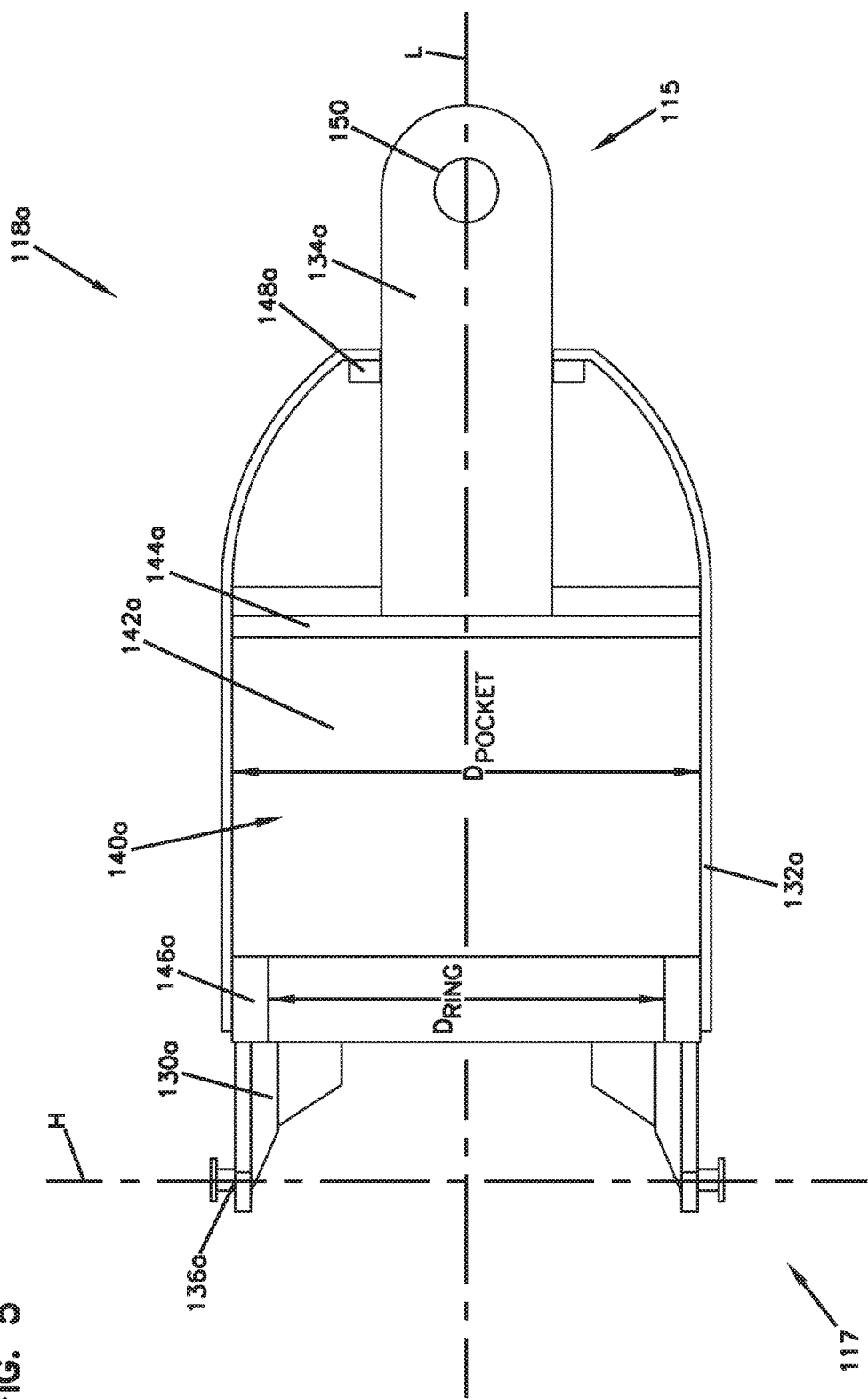
FIG. 5 illustrates a top view of a first body of the pullhead adapter of FIG. 2.

Referring now to FIG. 5, the first body 118a is shown. The second body 118b is substantially similar to the first body 118a, and therefore the description of the first body 118a following herein is also representative of the description of the second body 118b.

The joint extension 130a is shown to be connected to the main shell 132a. The main shell 132a is connected to the pulling eye extension 134a. In some embodiments, the joint extension 130a, main shell 132a, and pulling eye extension 134a are formed from a single piece of material. In other embodiments, the joint extension 130a, main shell 132a, and pulling eye extension 134a are formed from different materials such as a metal and a plastic. In some embodiments, the first body 118a is formed from a metal such as steel.

The joint extension 130a protrudes partially from the main shell 132a and can include attachment features 136a that are configured to allow the first body 118a to be connected to the second body 118b. In some embodiments, the attachment features 136a can be clips, interlocking hooks, integral pegs, or other similar feature that allows the first and second bodies 118a, 118b to be removably attached to one another.

The main shell 132a includes a generally tapered half-cylindrical outer surface 138a (as shown in FIGS. 2-4). An inside surface 140a includes a concave pocket portion 142a for receiving the adapter 103 and at least one rib 144a that is connected to the pulling eye extension 134a.

The outer surface 138a of the main shell 132a is configured to interface smoothly with the hole 114. In some embodiments, the outer surface 138a can be configured in other shapes such as a cone so as to travel smoothly through the hole 114 in the pulling direction.

Figure 6:
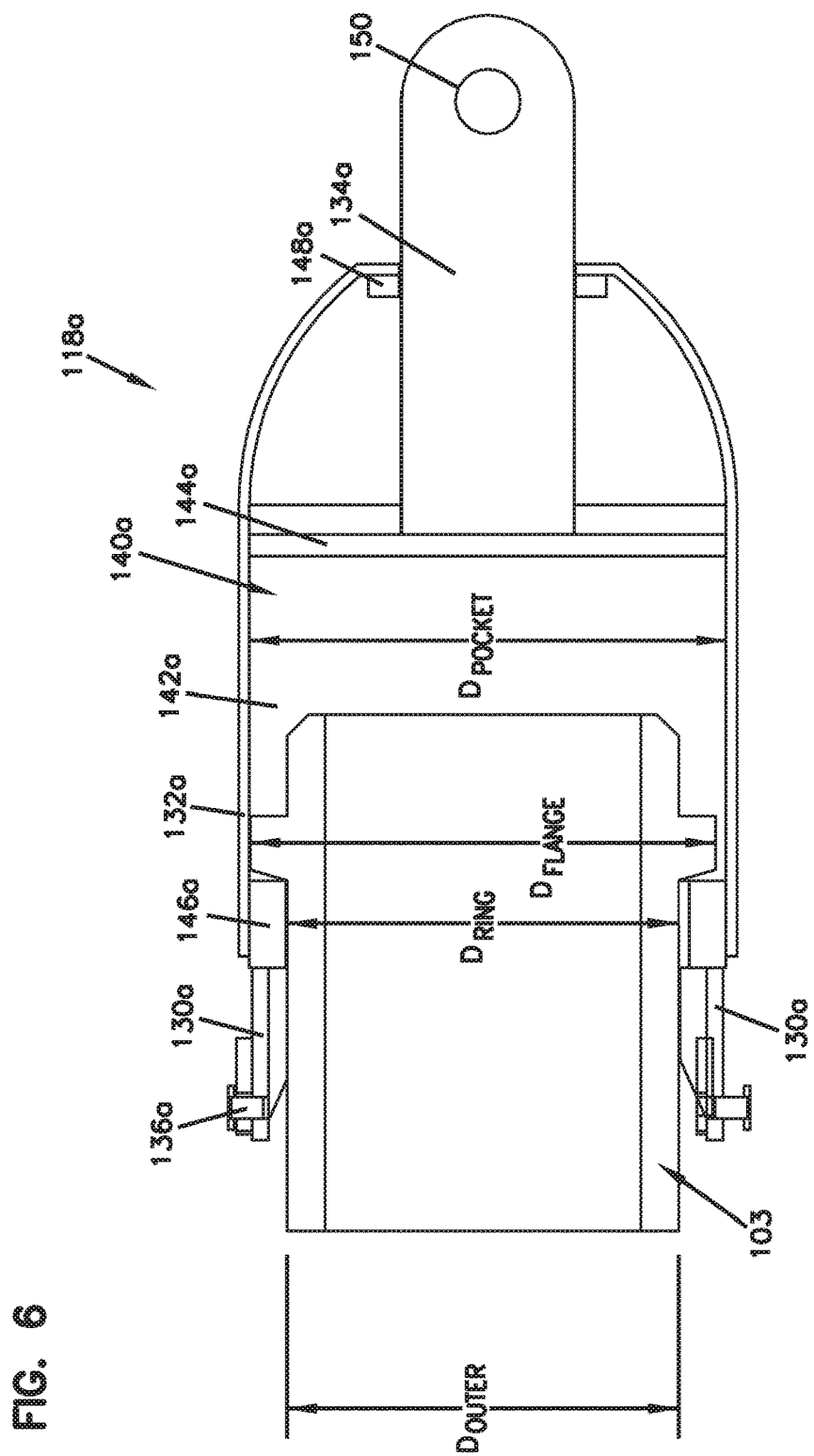
FIG. 6 illustrates a top view of the first body of the pullhead adapter of FIG. 2 installed on a pipe adapter.

The concave pocket portion 142a of the inside surface 140a is configured to receive the adapter 103. The concave pocket portion 142a is configured to mate with a concave pocket portion 142b of the second body 118b to form a pocket 142. In some examples, the pocket 142 can be generally cylindrical. In other examples, the pocket 142 can have a non-cylindrical shape. In some examples, the pocket 142 can be universally shaped to receive a variety of differently sized and shaped adapters 103. A width $D_{pocket}$ of the concave pocket portion 142a is greater than or equal to a width $D_{flange}$ of the flange 126 of the adapter 103, as shown in FIG. 6. $D_{flange}$ can be the width of the flange 126 at its widest portion. In some examples, $D_{flange}$ is the diameter of the flange 126.

The concave pocket portion 142a includes a portion of an interior retainer flange portion 146a that forms an interior retainer flange 146 with a substantially similar interior retainer flange portion 146b of the second body 118b. In some examples, the interior retainer flange formed by the interior retainer flange portions 146a, 146a form a continuous surface within the pocket portion 142. In other examples, interior retainer flange portions 146a, 146a form an incomplete surface that partially surrounds the interior portion of the concave pocket portions 142a, 142b. In some examples, the interior retainer flange portions 146a, 146a form a non-circular ring. The interior retainer flange 146 has an inner width $D_{ring}$ that is greater than or equal to a width $D_{outer}$ of the outer surface 128 of the adapter 103. However, the inner width $D_{ring}$ of the interior retainer flange 146 is less than the width $D_{flange}$ of the flange 126 (as shown in FIG. 6). $D_{ring}$ can be the width of the interior retainer flange 146 at its narrowest portion. In some examples, $D_{ring}$ is the diameter of the interior retainer flange 146. Therefore, when the first and second bodies 118a, 118b are mated together around the adapter 103 when the pullhead 104 is in the closed position (as shown in FIG. 2), the interior retainer flange portions 146a, 146b keep the adapter 103 within the pullhead 104 because the flange 126 is too large to be removed from the pocket formed by the concave pocket portions 142a, 142b of the first and second bodies 118a, 118b.

The rib 144a is secured to the concave pocket portion 142a. The rib 144a provides both structural support for the main shell 132a by resisting radial crushing forces and a mounting surface for the pulling eye extension 134a. Due to the tapered shape of the main shell 132a, the rib 144a cannot move in a direction toward the pulling eye extension 134a. Further, the rib 144a provides a rigid structure for attaching the pulling eye extension 134a. In the depicted embodiments, the main shell 132a also includes a secondary rib 148a that also resists radial forces and helps secure the pulling eye extension 134a to the main shell 132a. In some embodiments, the ribs 144a, 148a are just secured to the pulling eye extension 134a and are readily removable from the main shell 132a. In some embodiments, the ribs 144a, 148a are secured to the main shell 132a.

The pulling eye extension 134a forms the pulling eye 116 with a substantially similar pulling eye extension 134b of the second body 118b. The pulling eye extension 134a includes a through hole 150 that is configured to receive a connector (not shown) to attach the pulling cable 106. As noted above, the pulling eye extension 134a is secured to the main shell 132a via at least the rib 144a as the pulling eye extension 134a receives the pulling force from the pulling cable 106 and transfers such force to the main shell 132a, which then transfers the pulling force to the adapter 103.

Figure 7:
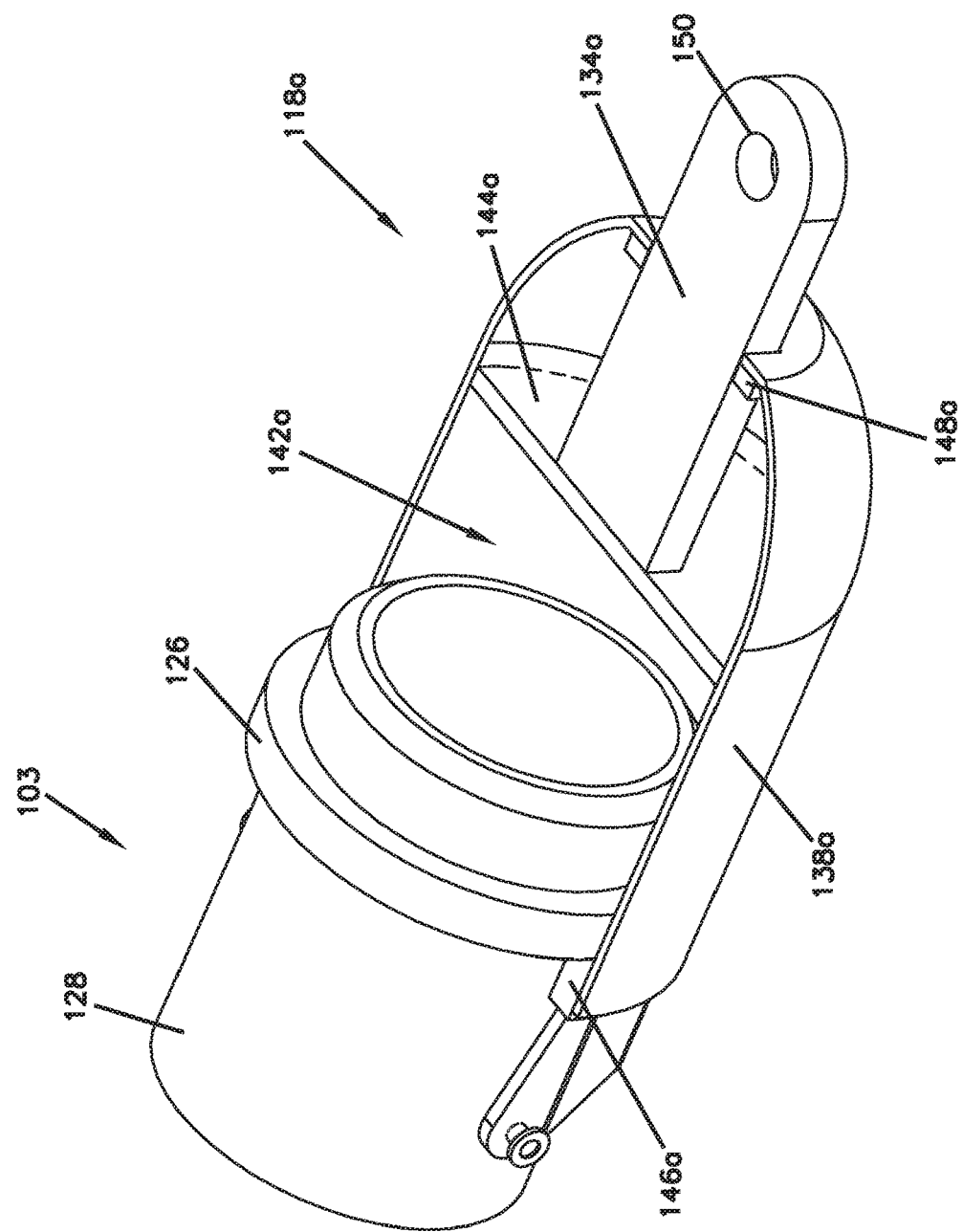
FIG. 7 illustrates a perspective view of the first body of the pullhead adapter of FIG. 2 installed on the pipe adapter.
Figure 8:
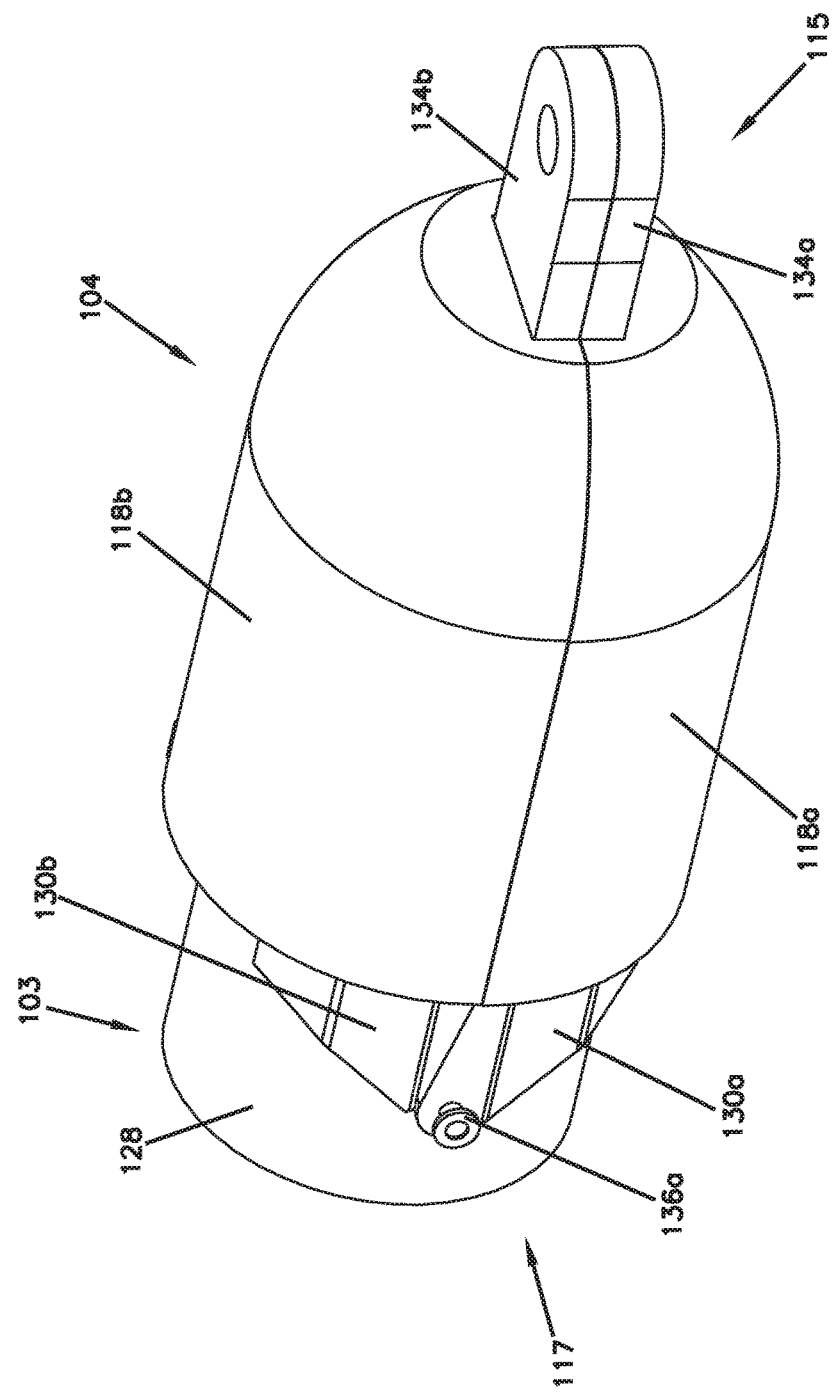
FIG. 8 illustrates a perspective view of the first body and a second body of the pullhead adapter of FIG. 2 installed on the pipe adapter.
Figure 9:
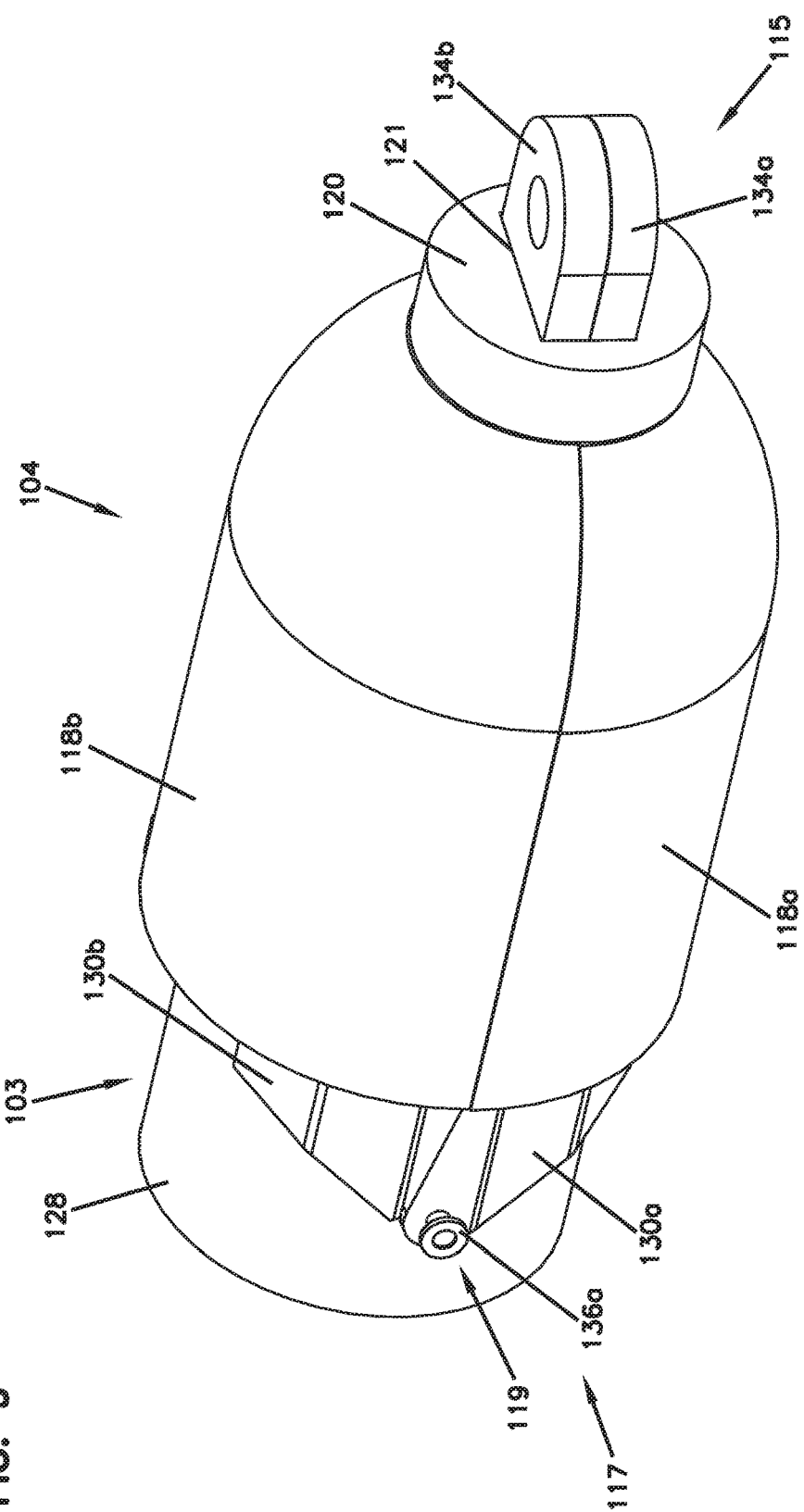
FIG. 9 illustrates another perspective view of the pullhead adapter of FIG. 2 in the closed position.

FIGS. 7-9 show the installation steps required in order to install the pullhead 104 to the adapter 103. As noted above, the adapter 103 can first be fused to the product pipe 102. Next, as shown in FIG. 7, the first body 118a is installed on the adapter 103. The second body 118b can also be installed first, as the first and second bodies 118a, 118b are substantially similar. To install the first body 118a, the flange 126 of the adapter 103 is placed within the concave pocket portion 142a of the first body 118a.

Next, as shown in FIG. 8, the second body 118b is installed over the adapter 103. Similar to the first body 118a, the flange 126 of the adapter is positioned within the concave pocket portion 142b of the second body 118b. The second body 118b is then attached to the first body 118a at the joint 119 by the attachment features 136a.

Next, as shown in FIG. 9, the retainer ring 120 is placed over the pulling eye extensions 134a, 134b to lock the first and second bodies 118a, 118b together. When the pulling cable 106 is installed in the pulling eye 116, the pulling cable 106 helps to keep the retainer ring 120 positioned around the pulling eye extensions 134a, 134b.

Figure 10:
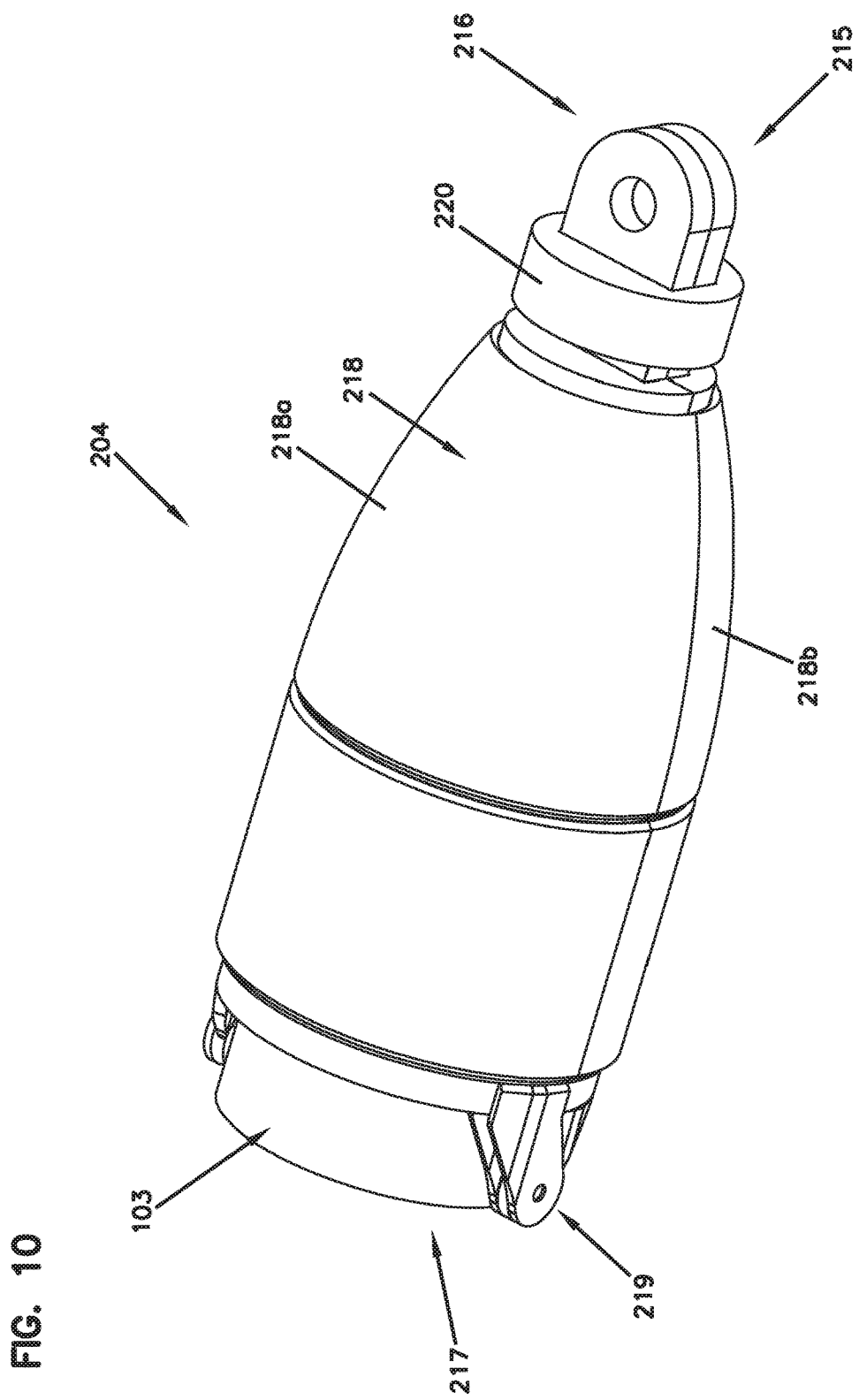
FIG. 10 illustrates a perspective view of a pullhead adapter in a closed position, according to one embodiment of the present disclosure.
Figure 11:
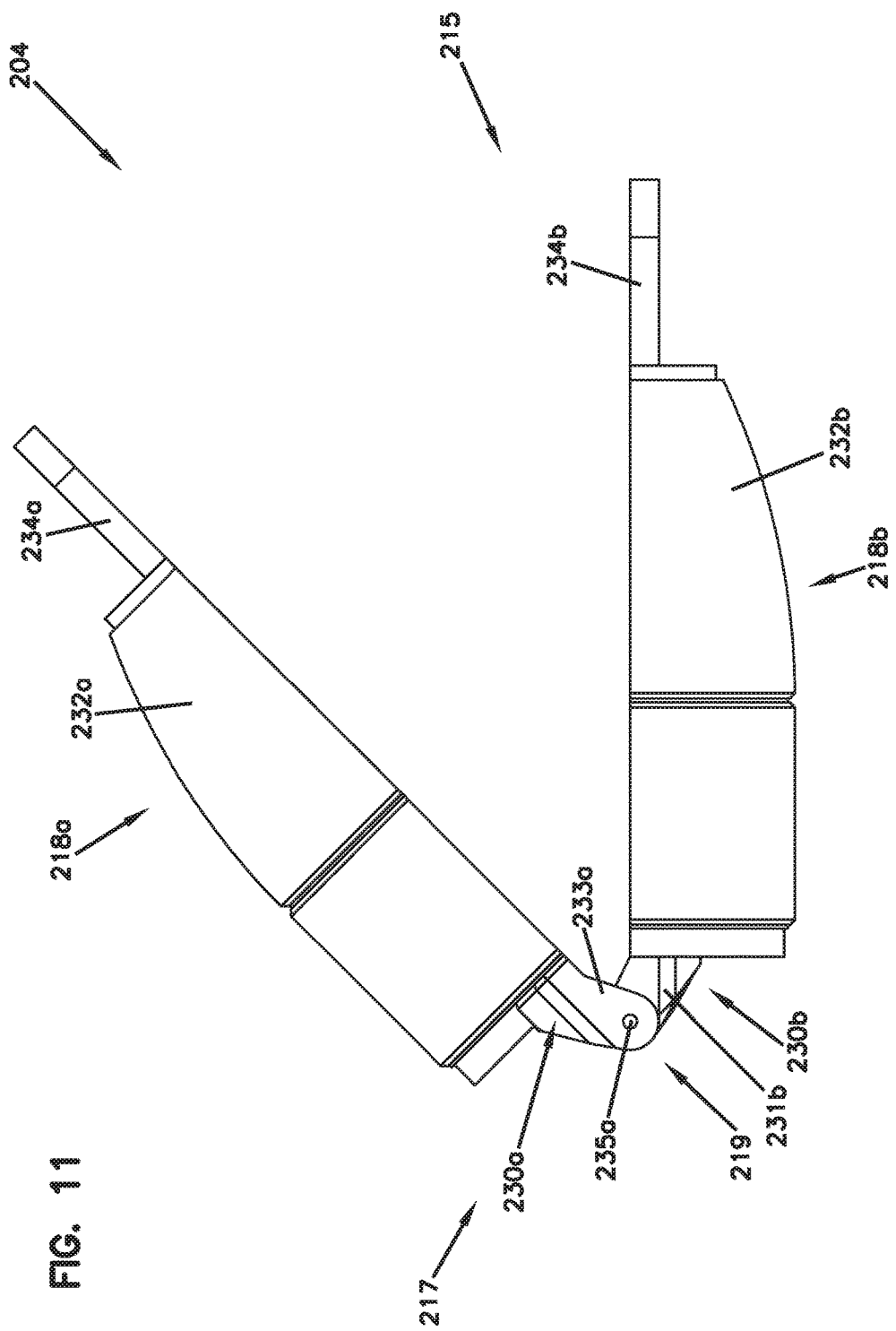
FIG. 11 illustrates a side view of the pullhead adapter of FIG. 10 in an open position.
Figure 12:
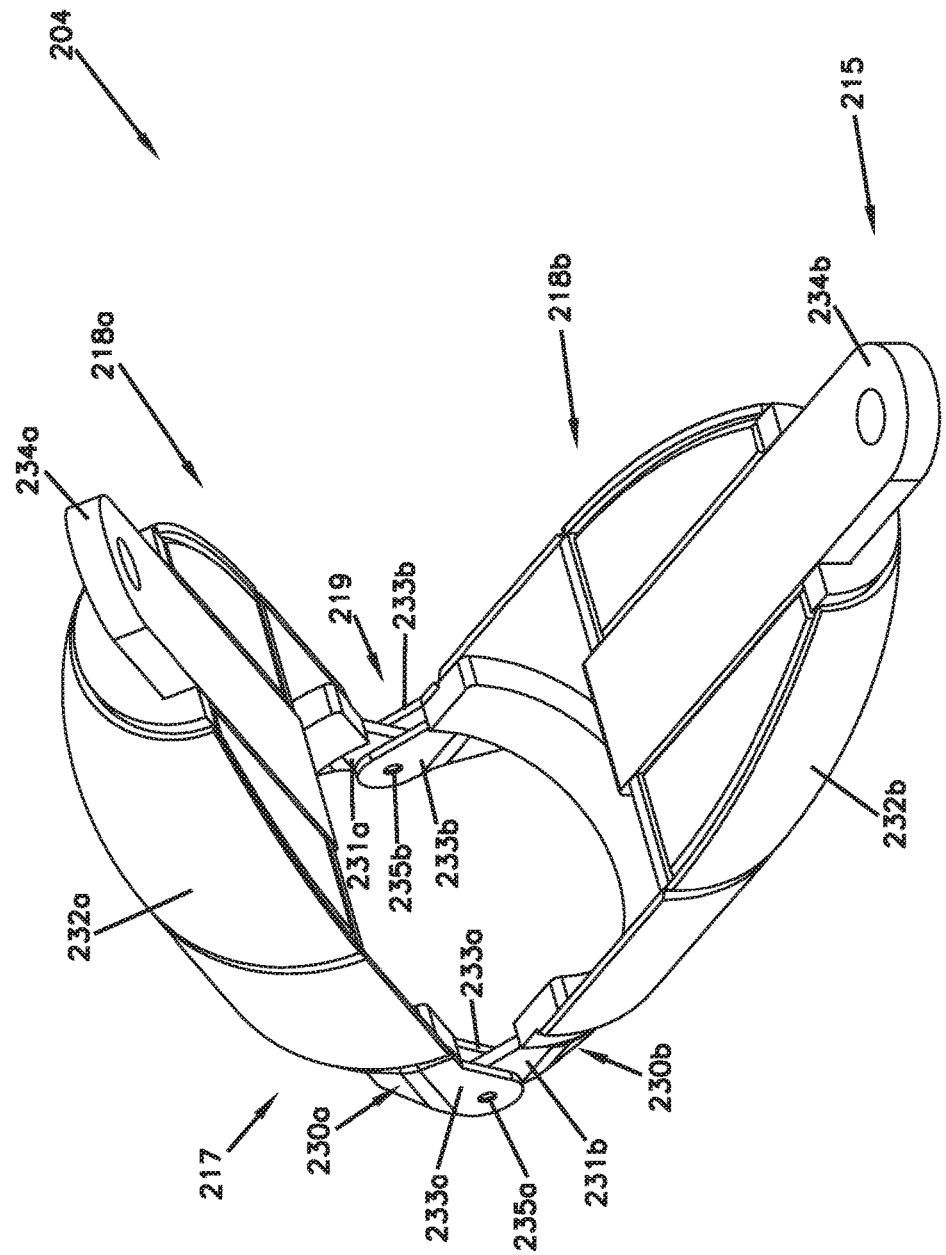
FIG. 12 illustrates a perspective view of the pullhead adapter of FIG. 10 in an open position.
Figure 13:
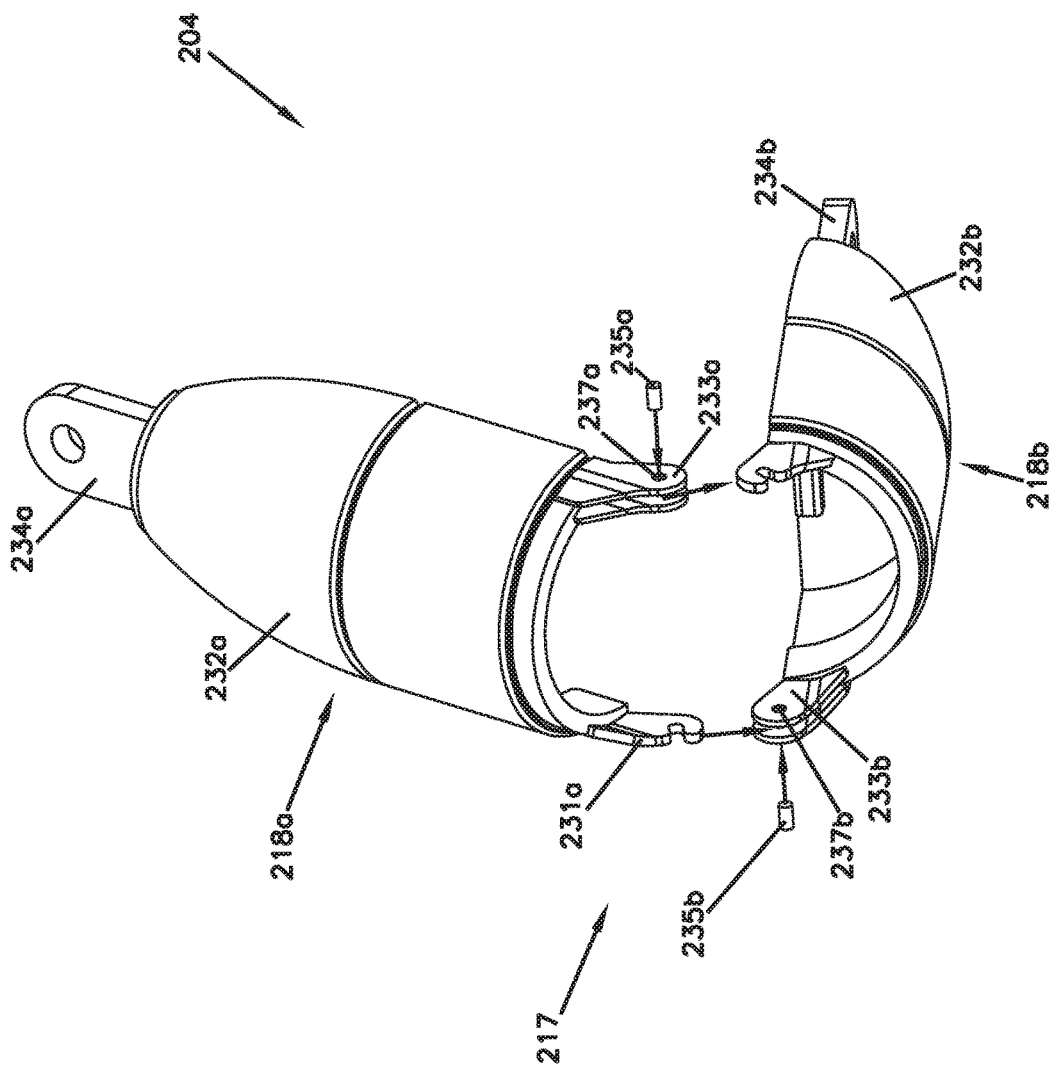
FIG. 13 illustrates a perspective partially exploded view of the pullhead adapter of FIG. 10 in an open position.

FIG. 10 shows a pullhead 204 installed in a closed position over the adapter 103, according to one embodiment of the present disclosure. FIGS. 11-13 show the pullhead 204 in an open and non-installed position. Like the pullhead 104 described above, the pullhead 204 includes a pulling eye 216, a housing 218, a joint 219, and a retainer ring 220. The housing 218 includes a first end 215 and a second end 217. Specifically, the housing 218 has a longitudinal axis L2 that is longitudinally separable and includes a first body 218a and a substantially similar second body 218b. Each of the first and second bodies 218a, 218b include a joint extension 230a, 230b, a main shell 232a, 232b, and a pulling eye extension 234a, 234b. The pullhead 204 operates in a substantially similar manner as the pullhead 104 described above.

The main shells 232a, 232b have an elongated construction in comparison to the main shells 132a, 132b described above. However, in some embodiments, the main shells 232a, 232b may have a wide variety of constructions and shapes.

Much like the bodies 118a, 118b described above, the bodies 218a, 218b are connectable at the joint 219 around an axis H2. Specifically, the bodies 218a, 218b are connected at the joint 219 by each joint extension 230a, 230b. Each joint extension 230a, 230b includes a hook 231a, 231b and a pair of plates 233a, 233b. The plates 233a, 233b include apertures 235a, 235b that are aligned and configured to receive pins 237a, 237b.

As shown in FIG. 13, the bodies 218a, 218b are configured to be joined together so that the hook 231a from the first body 218a is positioned within the pair of plates 233b of the second body 218b, and the hook 231b from the second body 218b is positioned within the pair of plates 233a of the first body 218a. The pair of pins 237a, 237b are configured to be placed within the apertures 235a, 235b of the plates 233a, 233b so as to secure the bodies 218a, 218b together. In some examples, the pair of pins 237a, 237b are configured to be secured to the plates 233a, 233b. In some examples, the pair of pins 237a, 237b are separable from the plates 233a, 233b.

Figure 14:
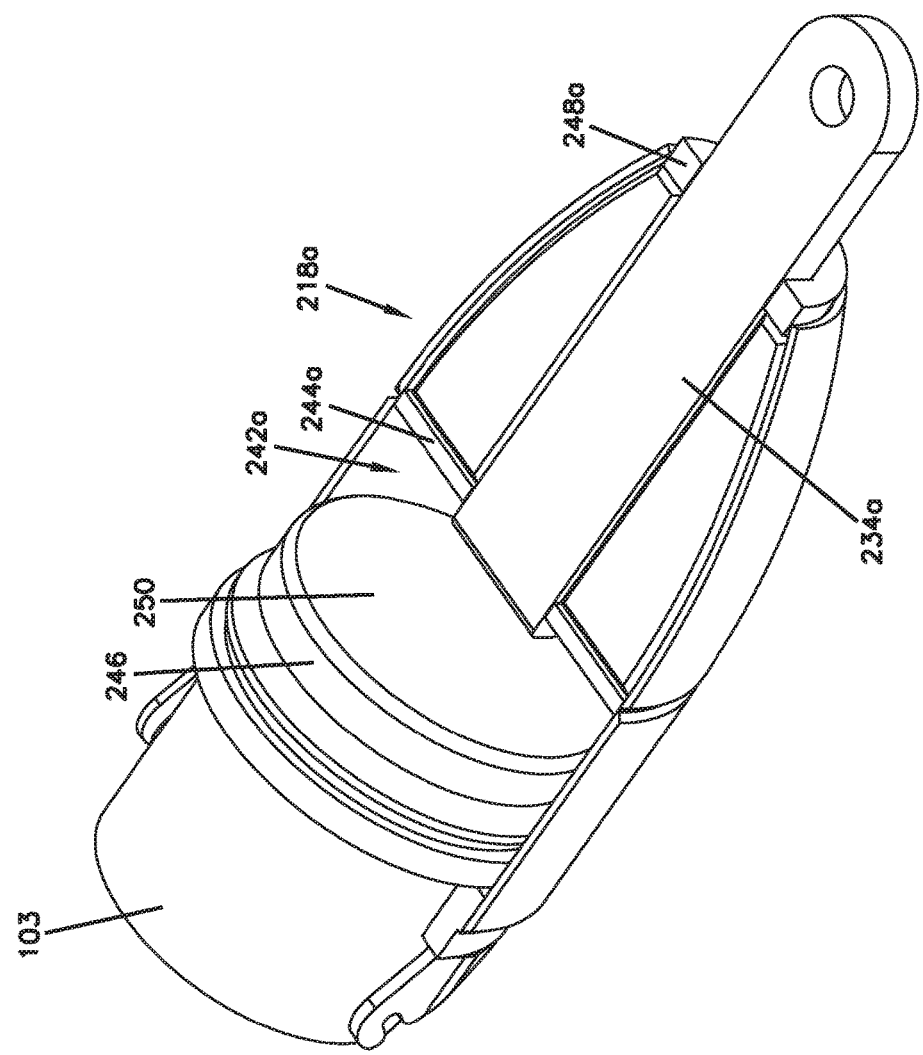
FIG. 14 illustrates a perspective view of a first body of the pullhead adapter of FIG. 10.
Figure 15:
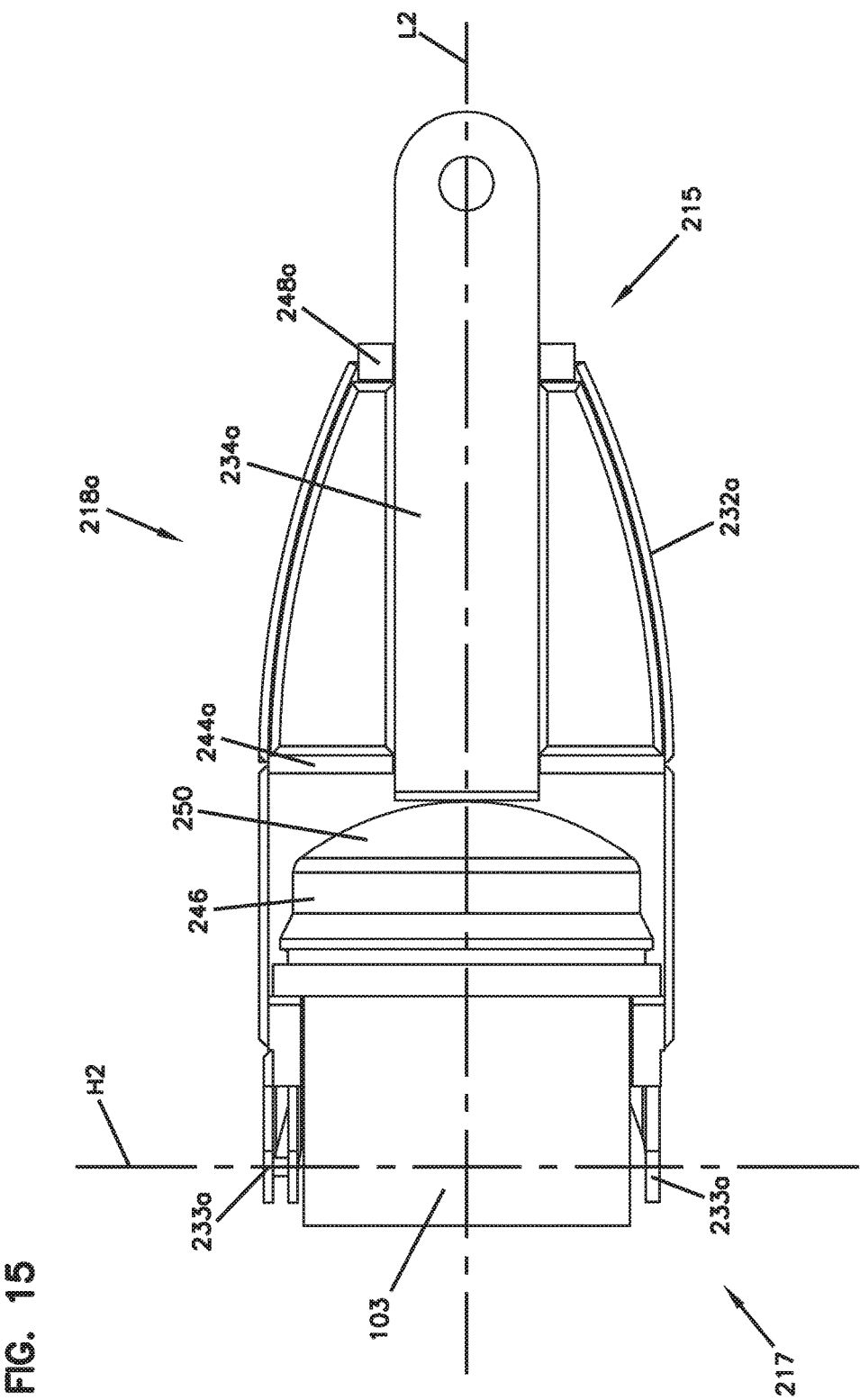
FIG. 15 illustrates a top view of the first body of the pullhead adapter of FIG. 10.

FIGS. 14 and 15 show the body 218a installed on the adapter 103. The main shell 232a of the first body 218a includes a pocket portion 242a for receiving the adapter 103 and at least one rib 244a that is connected to the pulling eye extension 234a. In some examples, the pocket portion 242a can be universally shaped to receive a variety of differently sized and shaped adapters 103. The adapter 103 is shown to include at least one gasket 246 and a cap 250. In the depicted embodiment, the main shell 232a also includes a secondary rib 248a that resists radial forces and helps secure the pulling eye extension 234a to the main shell 232a. The pulling eye extension 234a is configured to extend past the first rib 244a and into the pocket portion 242a.

The gasket 246 is configured to be removably placed over the adapter 103. In some embodiments, the gasket 246 is manufactured from elastic, rubber-like material. In some embodiments, multiple gaskets can be used on the adapter 103.

The cap 250 is configured to be installed over the gasket 246. The cap 250 is configured to receive a force from the pulling eye extensions 234a, 234b. In some embodiments, the cap 250 is manufactured from a resilient material, such as steel. In some embodiments, the cap 250 and the gasket 246 can be sized and shaped in a variety of different ways.

Figure 16:
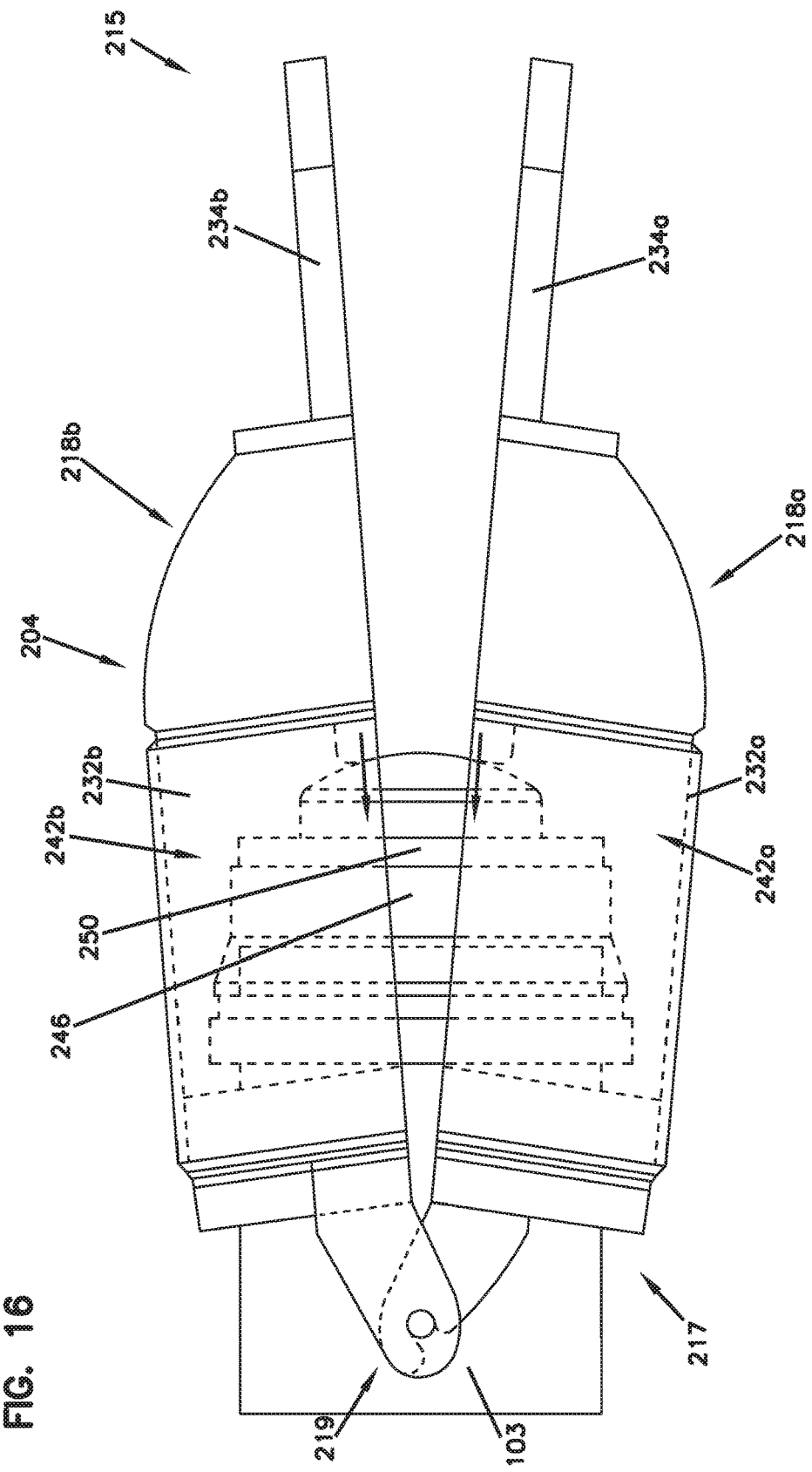
FIG. 16 illustrates a schematic side view of the pullhead adapter of FIG. 10 in the open position while being installed on an adapter.
Figure 17:
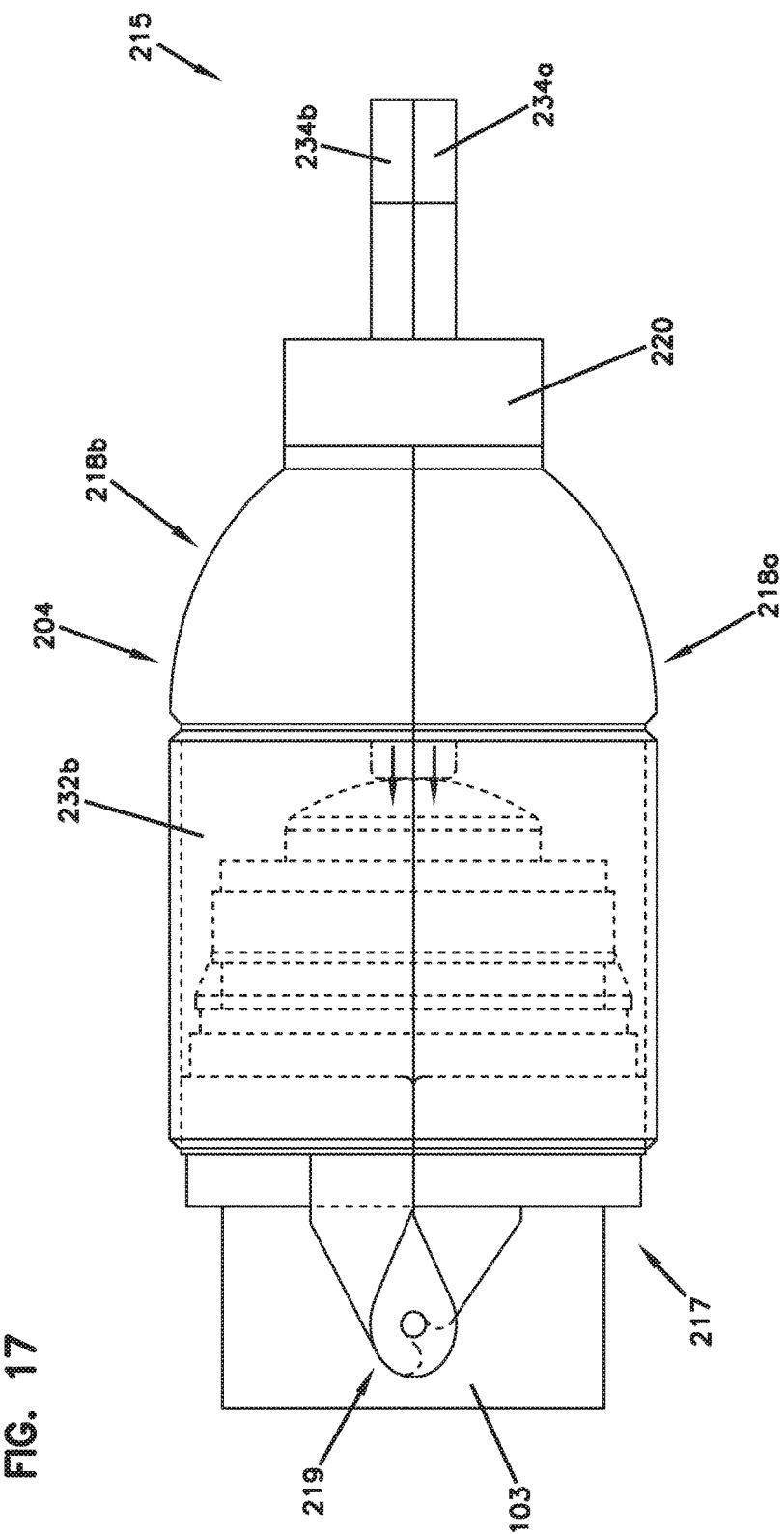
FIG. 17 illustrates a schematic side view of the pullhead adapter of FIG. 10 in the closed position while being installed on an adapter.

FIG. 16 shows a schematic view of the pullhead 204 being installed on the adapter 103. Like the pullhead 104 described above, the pullhead 204 is configured to receive the adapter 103 within the pocket portions 242a, 242b of the first and second bodies 218a, 218b. As the first and second bodies 218a, 218b are pivoted toward one another about the joint 219, the pulling eye extensions 234a, 234b begin to engage the cap 250. As shown, the pulling eye extensions 234a, 234b exert a force on the cap 250 and the gasket 246 so as to capture and firmly position the adapter 103 within the pullhead 204. FIG. 17 shows the pullhead 204 completely installed on the adapter 103.

Figure 18:
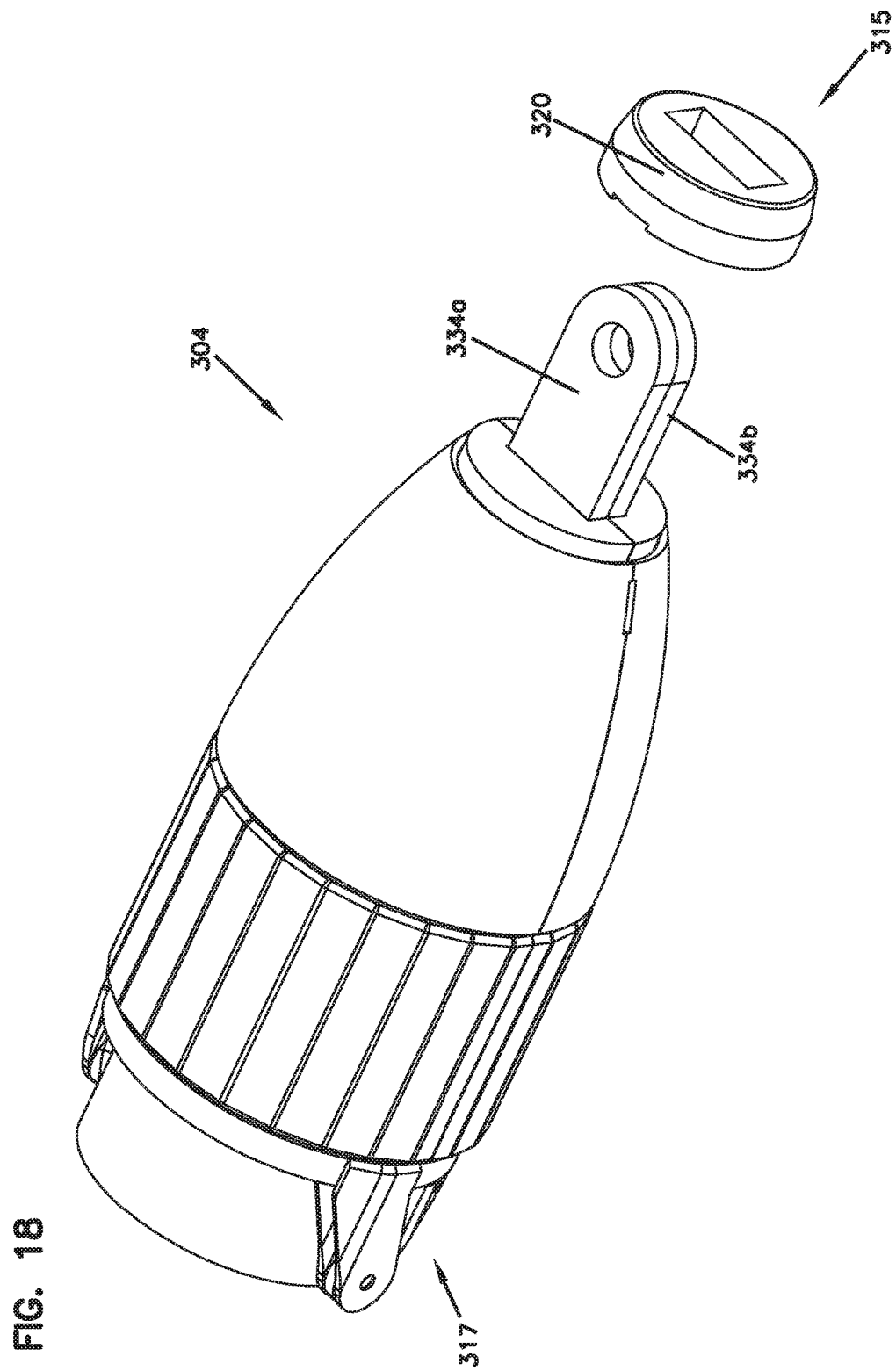
FIG. 18 illustrates a perspective view of a pullhead adapter in a retainer ring, according to one embodiment of the present disclosure.
Figure 19:
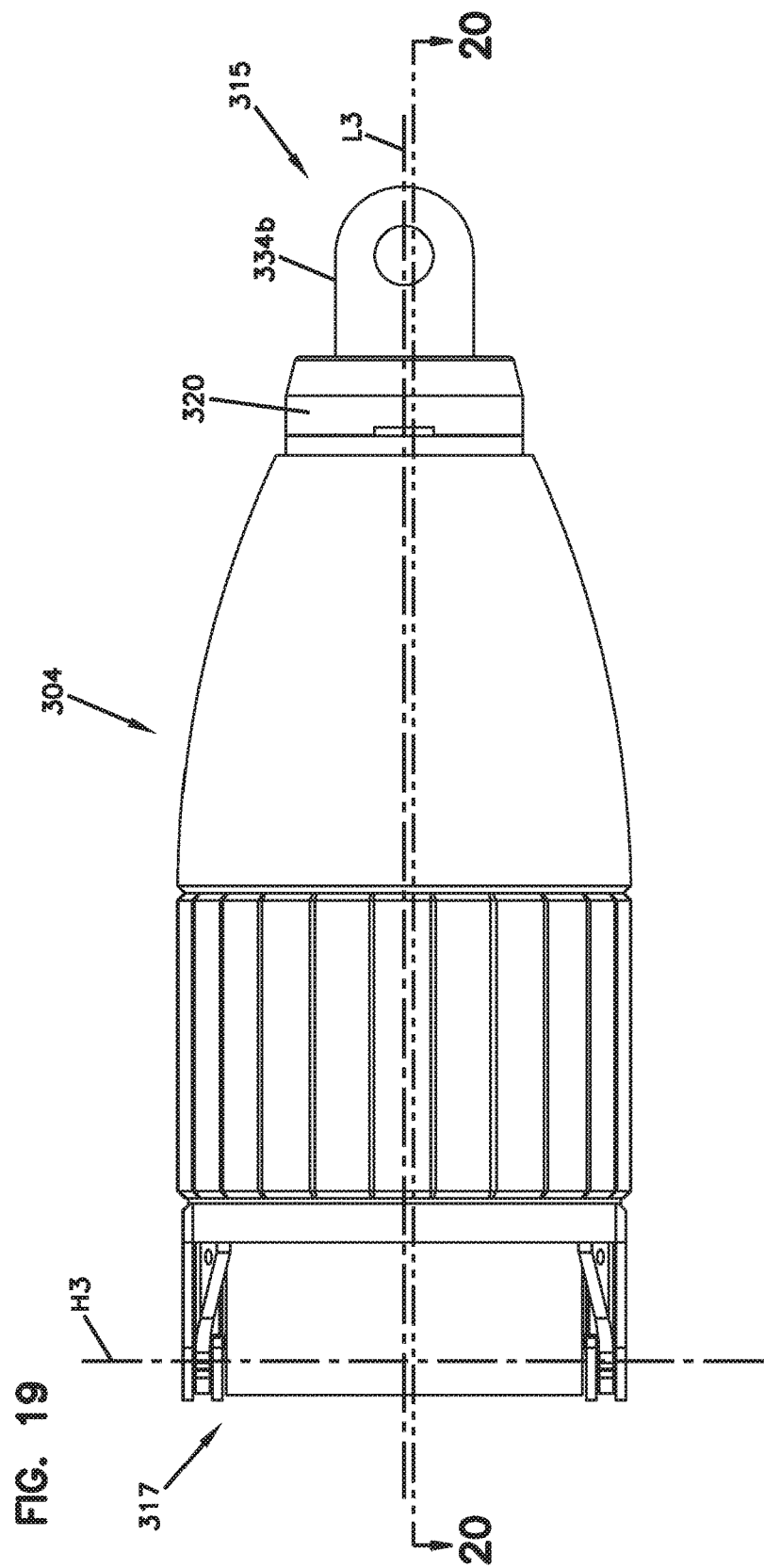
FIG. 19 illustrates a side view of the pullhead adapter of FIG. 18 in a closed position.
Figure 20:
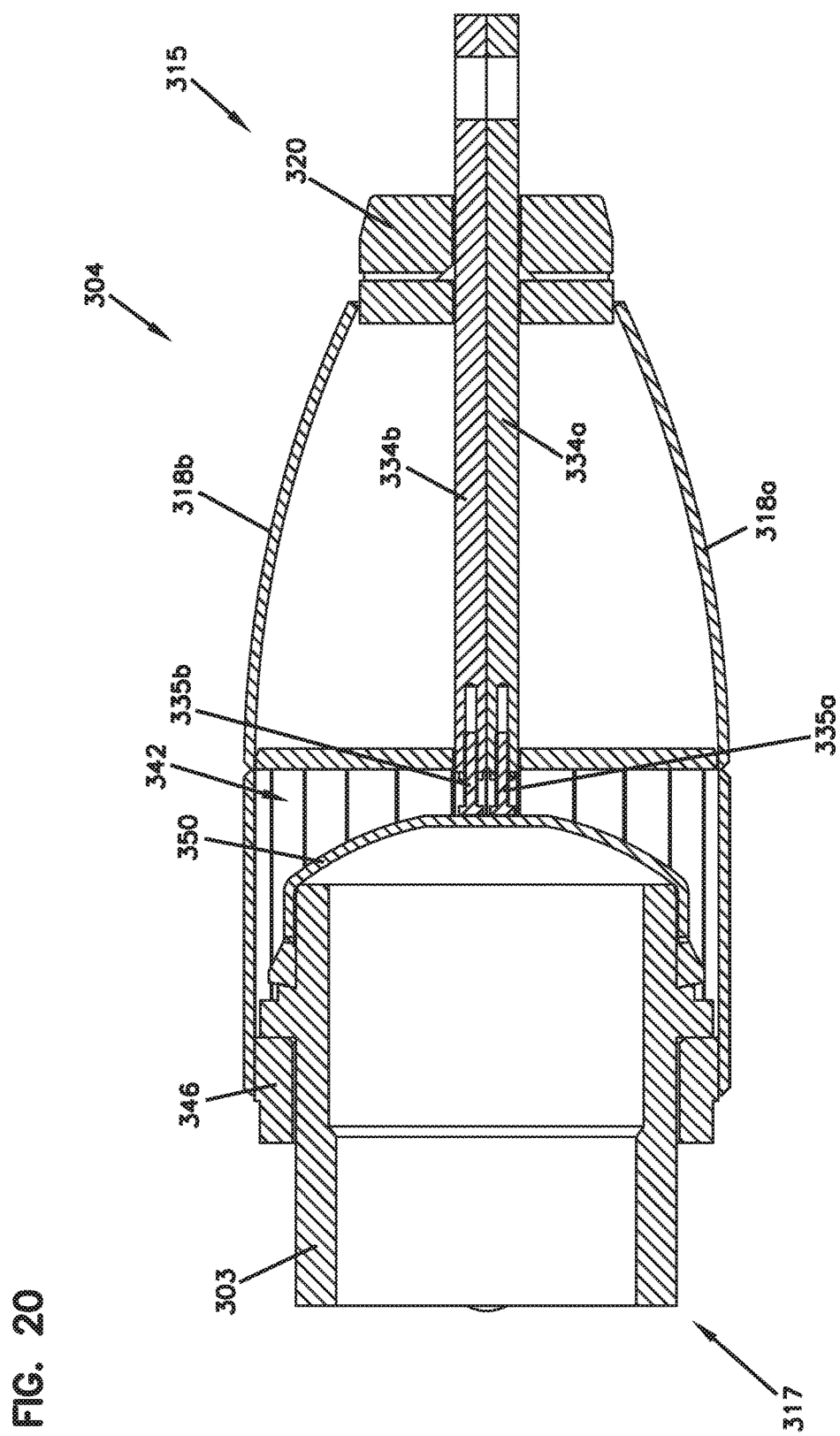
FIG. 20 illustrates a cross sectional view of the pullhead adapter of FIG. 18 along line 20-20 in FIG. 19.

FIG. 18 shows a perspective view of a pullhead 304 having a retainer ring 320, according to one embodiment of the present disclosure. FIG. 19 shows a side view of the pullhead 304, and FIG. 20 shows a cross-sectional view of the pullhead 304 along line 20-20 of FIG. 19.

The pullhead 304 and retainer ring 320 are substantially similar to the pullhead 104/204 and retainer ring 120/220. The pullhead 304 is configured to have a pair of bodies 318a, 318b that define a longitudinal axis L3 and are separably coupled at a joint 319 around an axis H3. The bodies 318a, 318b define an interior pocket portion 342 that has an interior retainer flange 346. The interior retainer flange 346 is configured to interface with a product (such as an adapter or a conduit) to retain the product within the interior pocket portion 342. In some examples, the pocket portion 342 can be universally shaped to receive a variety of differently sized and shaped products (such as adapters or a conduit).

In the depicted embodiment, the pullhead 304 includes pulling eye extensions 334a, 334b. In some examples, the pulling eye extensions 334a, 334b are substantially similar to the pulling eye extensions 234a, 234b of the pullhead 204. As shown in FIG. 20, the pulling eye extensions 334a, 334b include adjustable portions 335a, 335b that are configured to interface with a variety of different sizes and types of conduits or adapters. In one example, a cap 350 is installed over an adapter 303. In other examples still, the adjustable portions 335a, 335b are threadably attached to the pulling eye extensions 334a, 334b so as that they can be adjusted to firmly position a conduit or adapter within the pocket portion 342.

Figure 21:
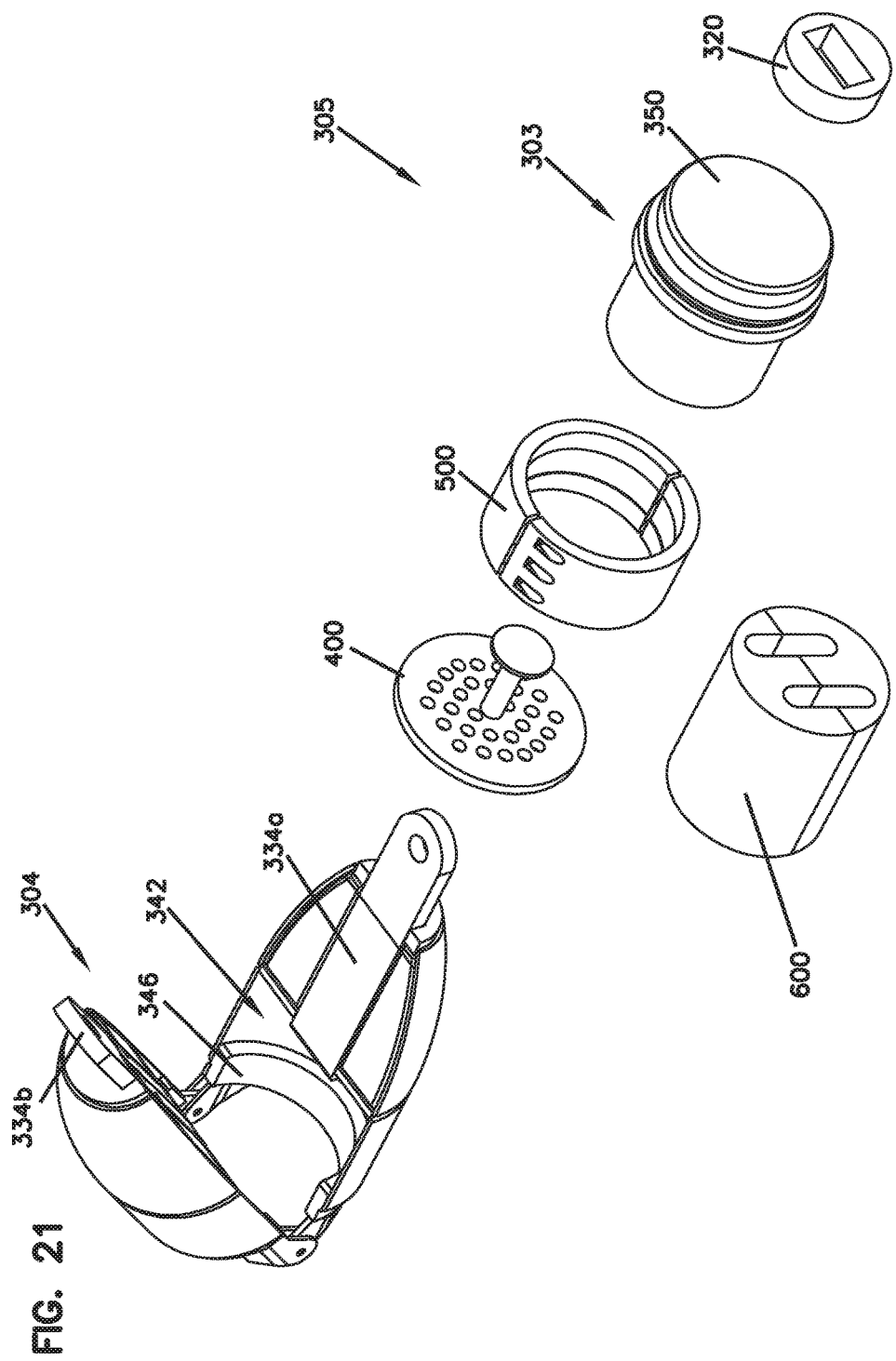
FIG. 21 illustrates a perspective view of the pullhead adapter of FIG. 18 and associated accessories, according to one embodiment of the present disclosure.

FIG. 21 shows a perspective view of the pullhead 304 with a series of accessories 305 that are configured to be positioned within the interior pocket portion 342 of the pullhead 304. The accessories 305 can include, for example, a multiple pipe connector plate 400, a removable collar 500, a removable multiple pipe collar 600, and an adapter 303 that is substantially similar to the adapter 103. In some examples, the accessories 305 are configured to interface with the interior retainer flange 346 of the interior pocket portion 342 so that when the pullhead 304 is secured around the accessory 305, the accessory 305 is captured and retained within the interior pocket portion 342 of the pullhead 304.

While the accessories 305 are shown associated with the pullhead 304, the accessories 305 can also be used with the pullhead 104 and 204 described above. In some examples, the accessories 305 can be easily exchanged into and out of the pullhead 104, 204, 304 without needing to attach the accessories to the pullhead 104, 204, 304. The accessories 305 offer the user the flexibility to use pullhead 104, 204, 304 with a variety of different products while only needing to use one of the accessories 300, 400, 500, and 303. The pullhead 304 is configured to receive a variety of other accessories within the interior pocket portion 342.

Figure 22:
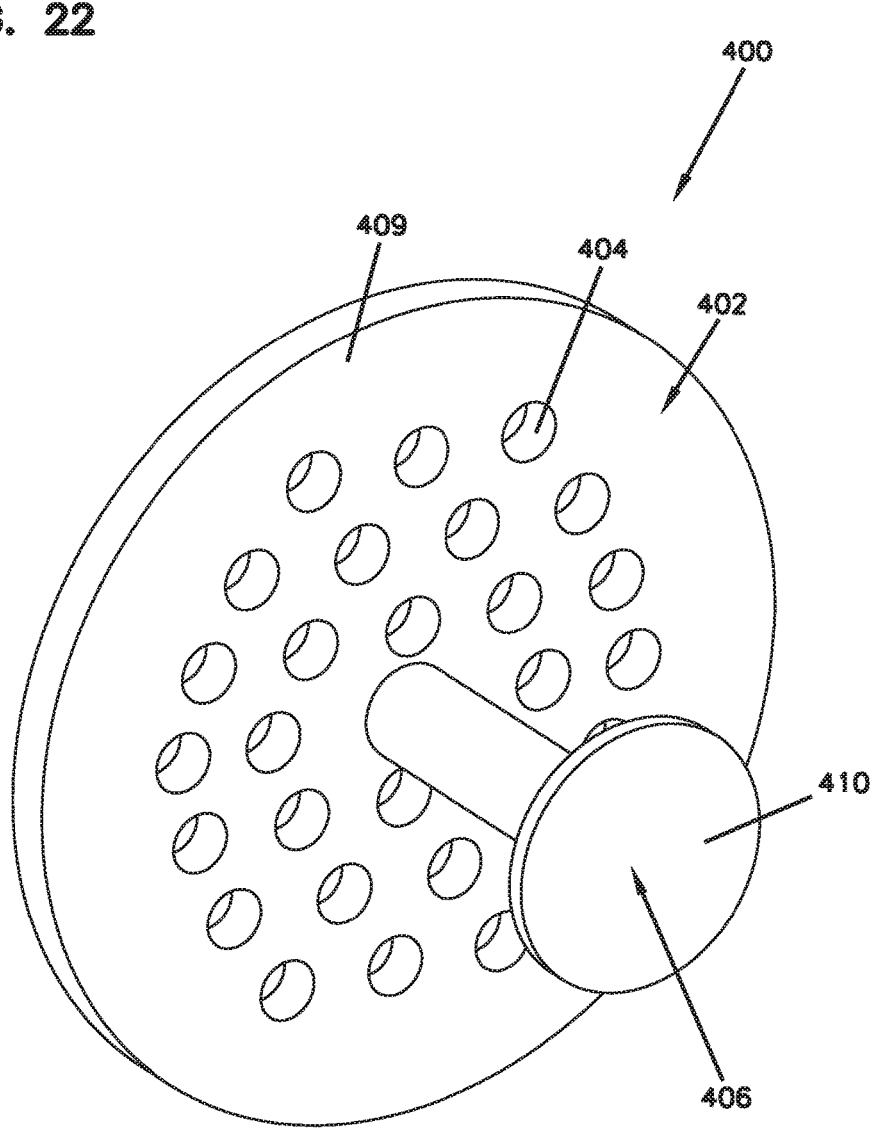
FIG. 22 illustrates a perspective view of a multiple pipe connector plate accessory, according to one embodiment of the present disclosure.
Figure 23:
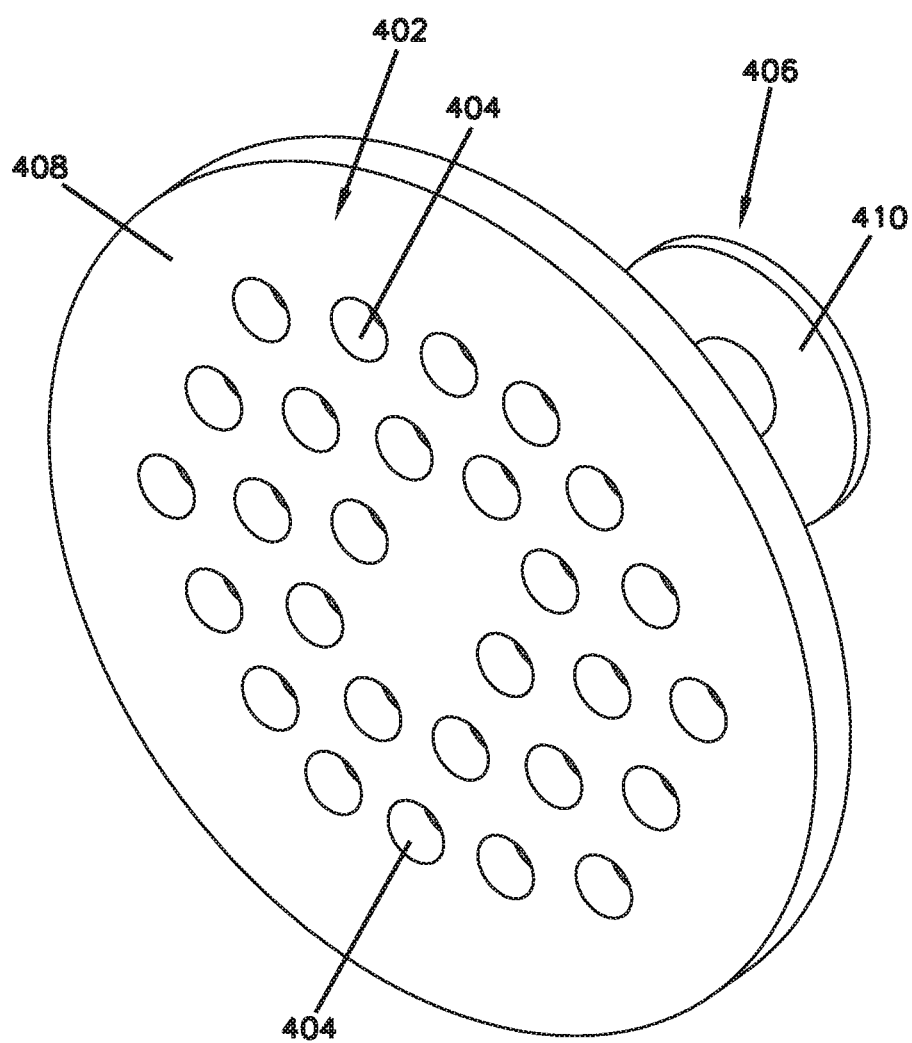
FIG. 23 illustrates another perspective view of the multiple pipe connector plate accessory of FIG. 22, according to one embodiment of the present disclosure.

FIGS. 22 and 23 show perspective views of the multiple pipe connector plate 400. The multiple pipe connector plate 400 includes a plate portion 402 having a plurality of apertures 404 and a post portion 406. The plate portion 402 is coupled to the post portion 406.

The plate portion 402 is configured to interface at a rear side 408 with the interior retainer flange 346 of the pullhead 304 and be attached to the post portion 406 at a front side 409. In some examples, the plate portion 402 includes a single aperture 404. In other examples, the plate portion 402 includes a plurality of apertures 404. In some examples, the apertures 404 on the plate portion 402 are configured to interface with individual pulling eyes (not shown) such as devises, hooks, or other like devices for attaching individual conduits thereto. In other examples, the apertures 404 are configured to receive conduits directly therein. The multiple pipe connector plate 400 can be used to pull a single conduit via the plate portion 402 or a plurality of conduits via the plate portion 402.

In some examples, the post portion 406 is configured to interface with the interior pocket portion 342 to stabilize the multiple pipe connector plate 400 within the interior pocket portion 342. In some examples, the post portion 406 is configured to interface with the pulling eye extensions 334a, 334b of the pullhead 304 when installed in the interior pocket portion 342. As depicted, the post portion 406 can have a face 410 that is configured to contact the interior pocket portion 342 and/or pulling eye extensions 334a, 334b.

Figure 24:
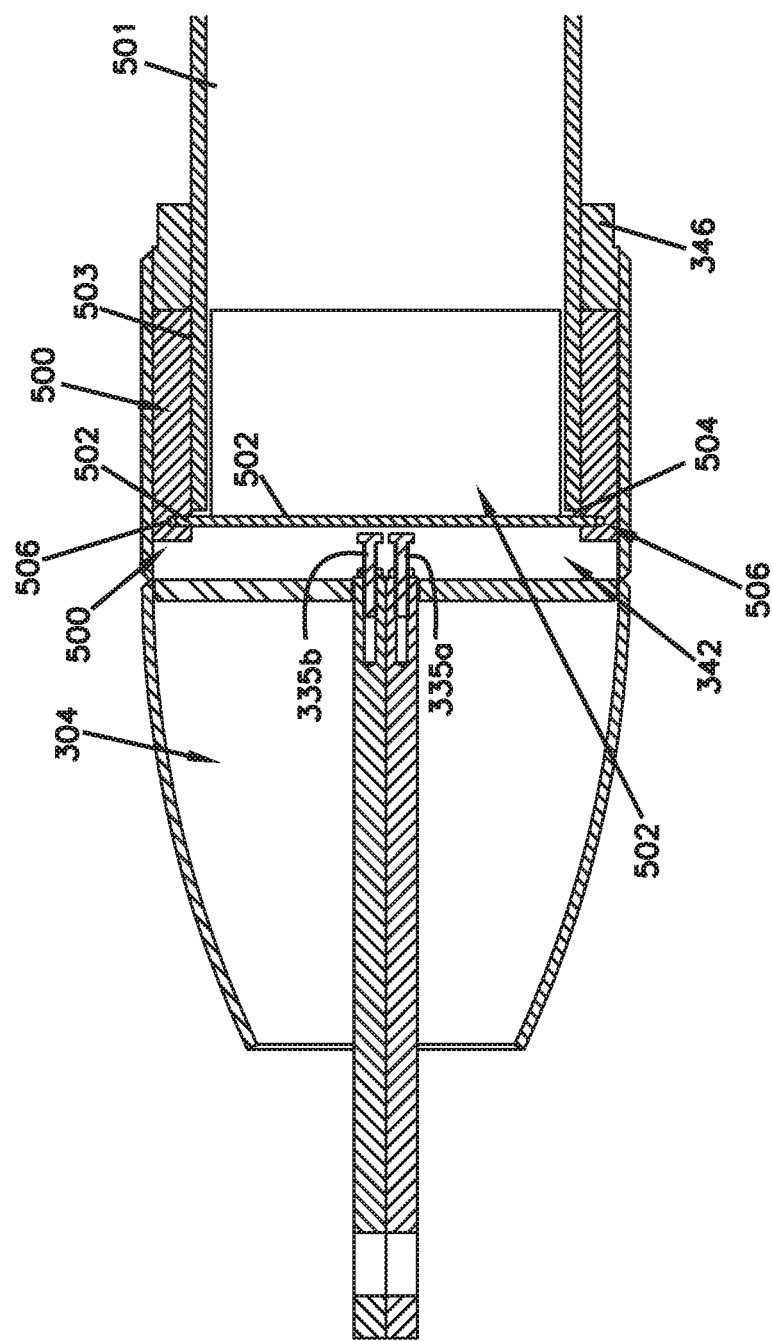
FIG. 24 illustrates a schematic cross sectional view of a removable collar accessory positioned within the pullhead adapter of FIG. 18, according to one embodiment of the present disclosure.

FIG. 24 shows a schematic cross section of the removable collar 500 positioned within the pullhead 304. The removable collar 500 is configured to be positioned around a conduit 501 to allow the conduit 501 to be pulled by the pullhead 304. In some examples, the conduit 501 can be a PVC conduit. Specifically, in some examples, the conduit 501 is fusible PVC.

The collar 500 is configured to be removably attached around the conduit 501 and to interface with the interior retainer flange 346 within the interior pocket portion 342 so as to couple the conduit 501 to the pullhead 304. In some examples, the collar 500 includes a gripping texture on an interior surface 503 so as to increase the attachment of the collar 500 to the conduit 501.

In some examples, the collar 500 can be separable and positionable around a cap portion 502 that is in communication with the conduit 501 to axially fix the collar 500 to the conduit 501. In some examples, the cap portion 502 is integral to the conduit 501. In other examples, the cap portion 502 is fused, attached, or welded to the conduit 501. In other examples still, the cap portion 502 is positioned within the conduit portion 501. In some examples, the cap portion 502 is constructed of a material that is less flexible than the material from which the conduit 501 is constructed.

In the depicted example, the collar 500 can have a recess 504 that is configured to receive a portion of the cap portion 502. In some examples, the recess 504 of the collar 500 can include a seal 506 positioned therein around the cap portion 502.

Figure 25:
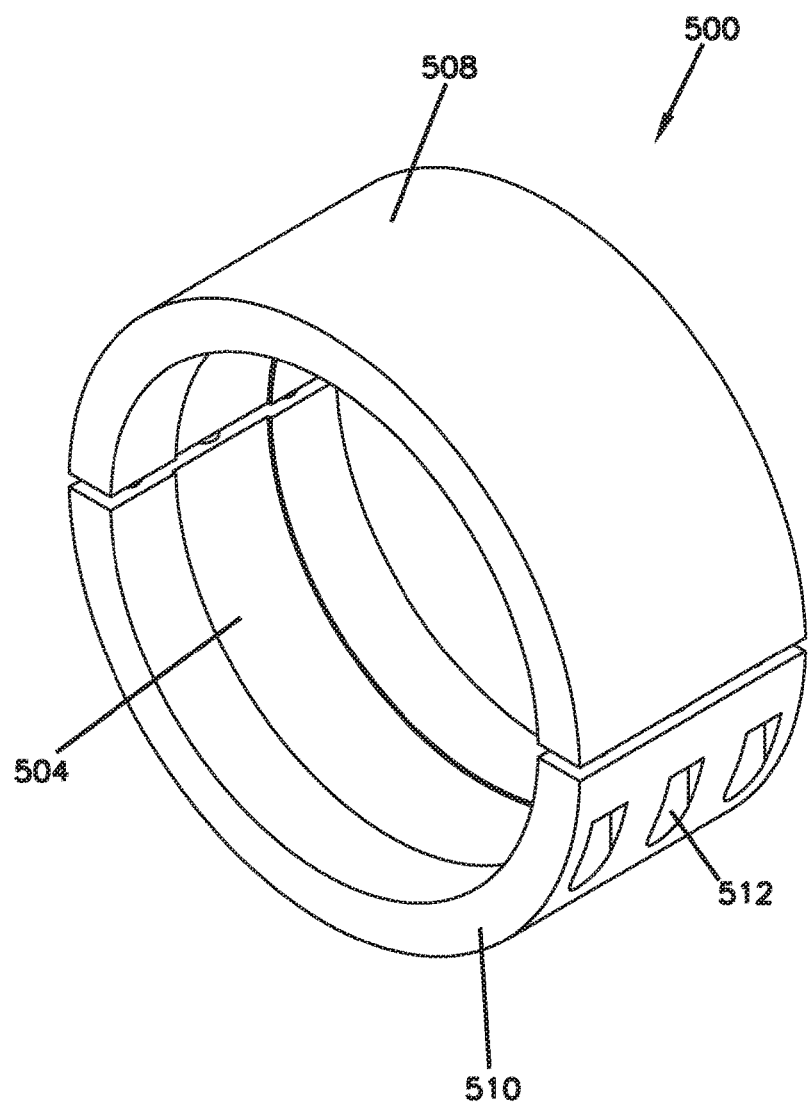
FIG. 25 illustrates a perspective view of the removable collar accessory of FIG. 24.
Figure 26:
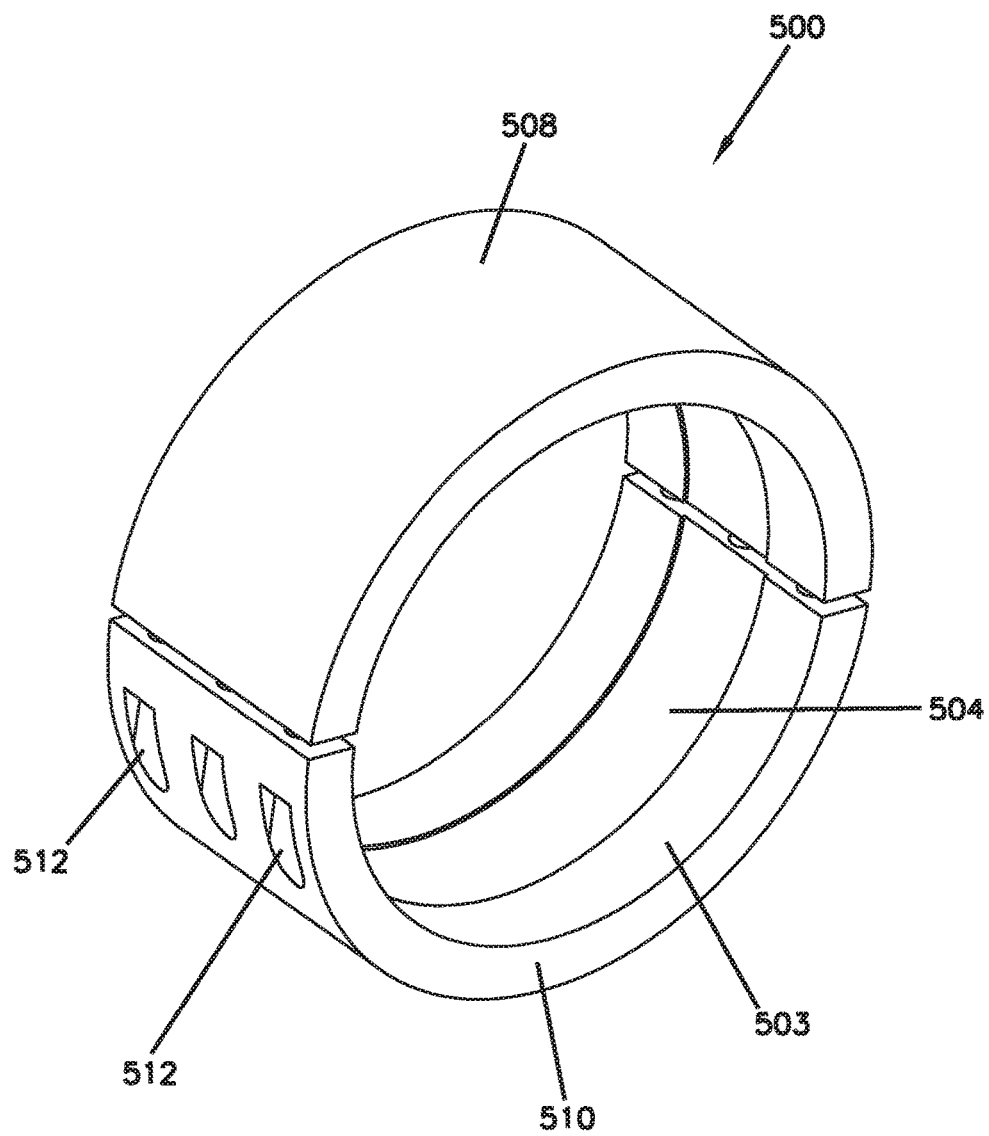
FIG. 26 illustrates another perspective view of the removable collar accessory of FIG. 24.

Perspective views of the removable collar 500 are shown in FIGS. 25 and 26. In some examples, the removable collar 500 includes a first collar body 508 and a second collar body 510. In some examples, the collar bodies 508, 510 are attached to one another using fasteners fastened within a plurality of apertures 512 within the first and second collar bodies 508, 510.

Figure 27:
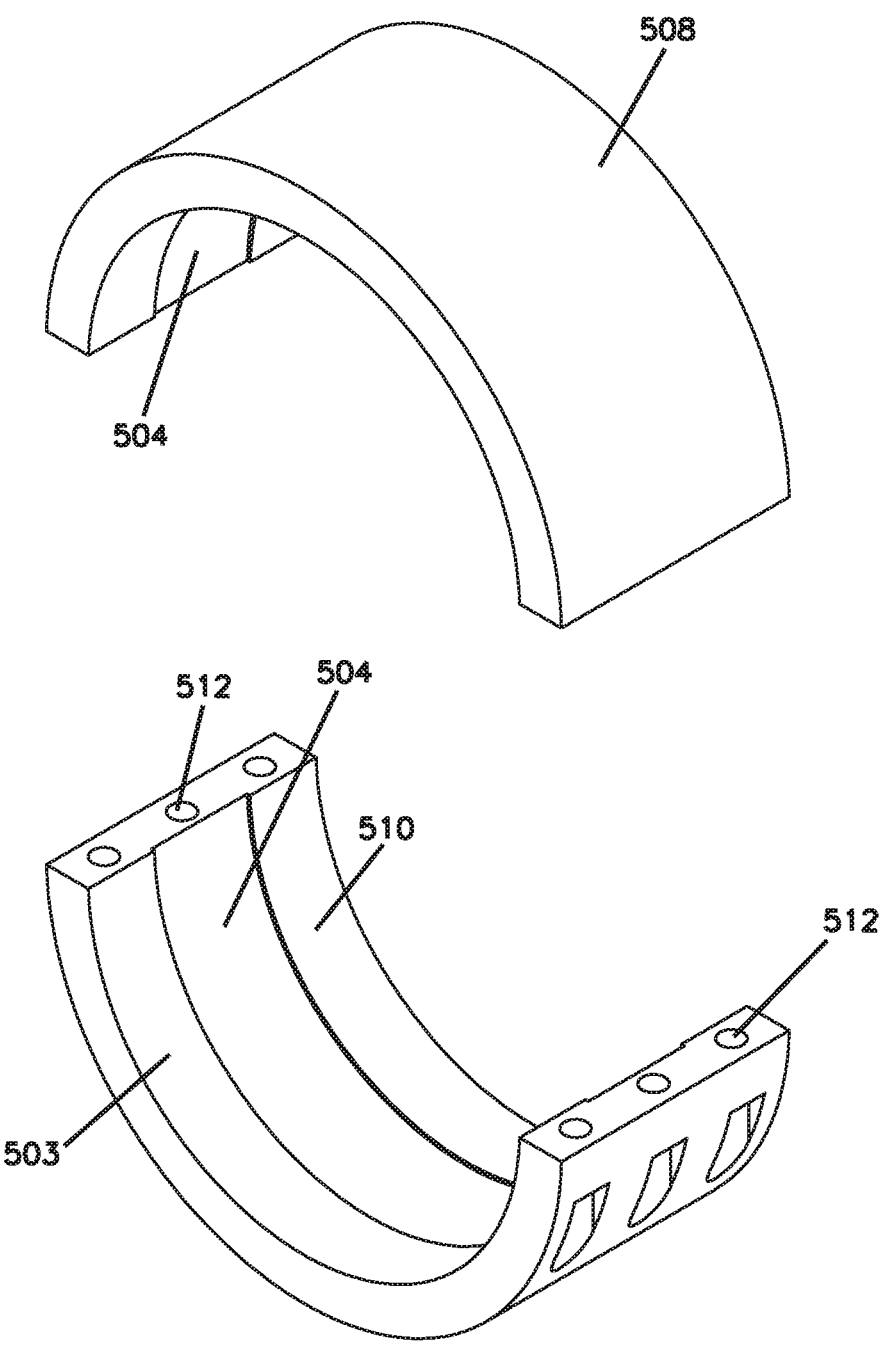
FIG. 27 illustrates an exploded perspective view of the removable collar accessory of FIG. 24.

FIG. 27 shows the first and second collar bodies 508, 510 separated from one another. In some examples, when installing the collar 500 over the cap portion 502 and conduit 501, the first collar body 508 is positioned around the conduit 501 so the recess 504 is positioned around a section of cap portion 502 having the largest outer width. The second collar body 510 is then positioned around conduit 501 and cap portion 502 so the recess 504 is positioned around a section of cap portion 502 having the largest outer width and fixed to the first collar body 508 via fasteners positioned within the apertures 512.

Figure 28:
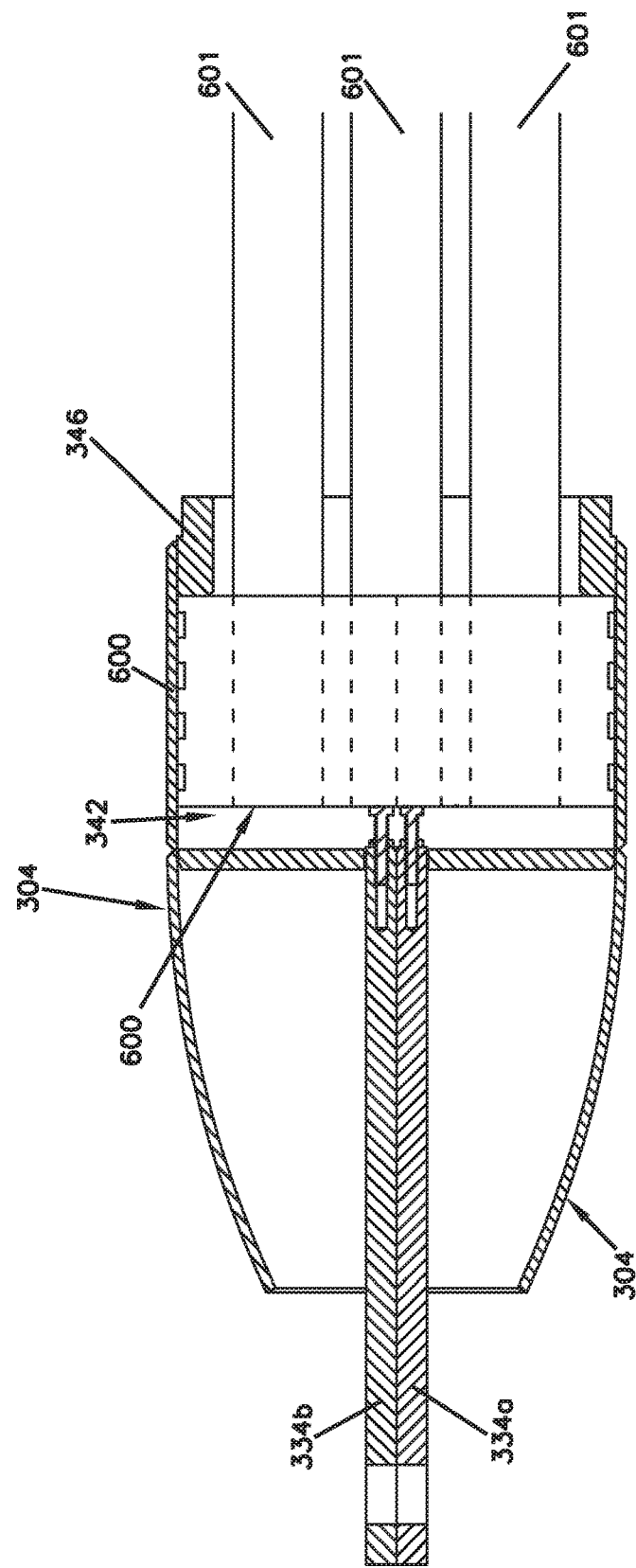
FIG. 28 illustrates a schematic cross sectional view of a removable multiple pipe collar accessory positioned within the pullhead adapter of FIG. 18, according to one embodiment of the present disclosure.

FIG. 28 shows a schematic cross section of the pullhead 304 with a removable multiple pipe collar 600 positioned within the interior pocket portion 342. The removable multiple pipe collar 600 is configured to be positioned around multiple conduits 601 to allow the conduits 601 to be pulled by the pullhead 304. In some examples, the conduit 601 can be a PVC conduit.

Like collar 500, collar 600 is configured to be removably attached around the conduit 601 and to interface with the interior retainer flange 346 within the interior pocket portion 342 so as to couple the conduit 601 to the pullhead 304. In some examples, the collar 600 is configured to be attached to more than one conduit 601 at a time.

Figure 29:
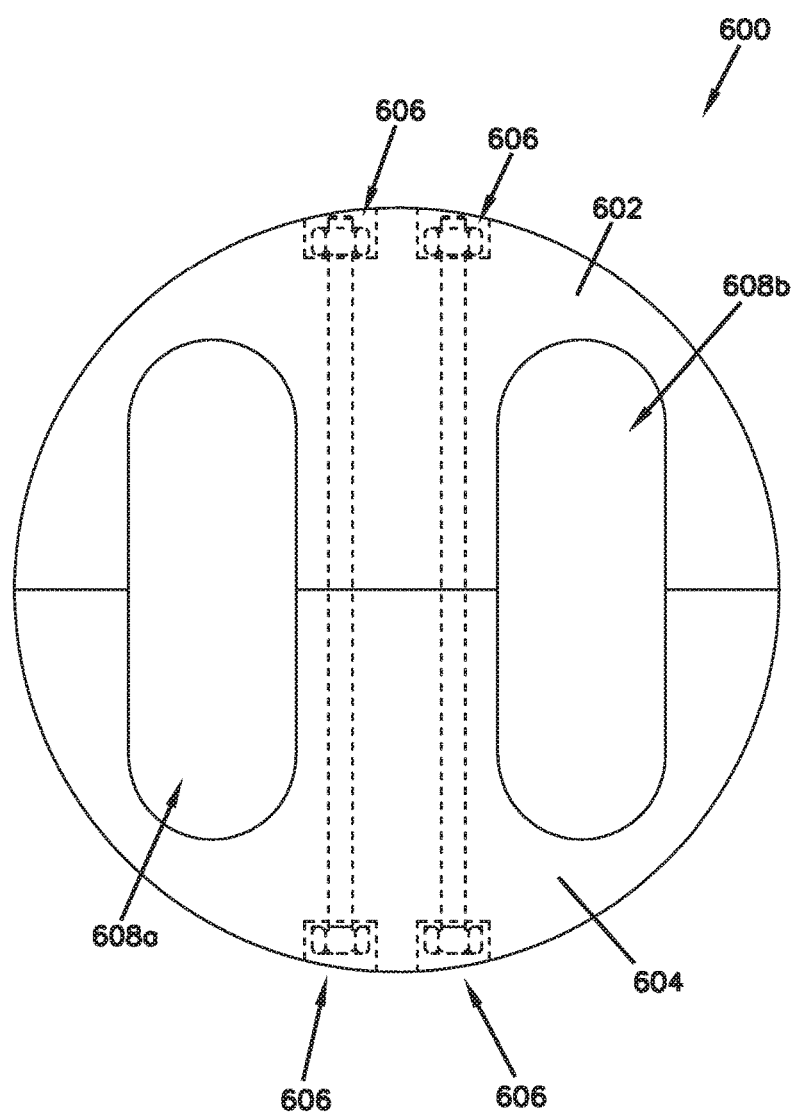
FIG. 29 illustrates a front view of the removable multiple pipe collar accessory of FIG. 28.
Figure 30:
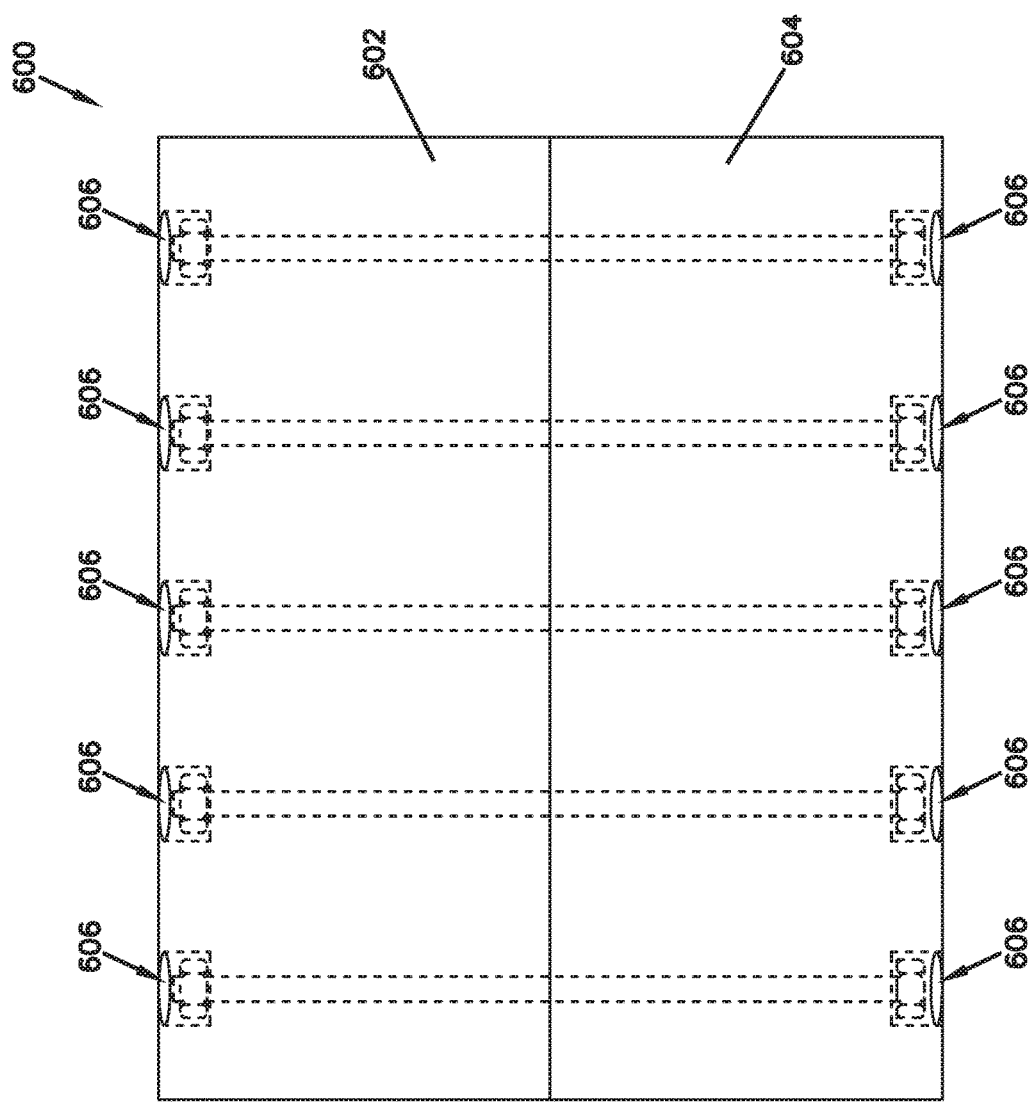
FIG. 30 illustrates a side view of the removable multiple pipe collar accessory of FIG. 28.

FIG. 29 shows an end view of the collar 600. FIG. 30 shows a side view of the collar 600. The collar 600 includes a first body 602 and a second body 604 that are coupled together by way of a least one fastener 606. Together, the first and second bodies 602, 604 define a pair of conduit slots 608*a*, 608*b*. Each slot 608*a*, 608*b* is configured to receive a single or multiple conduits 601 therein. In some examples, the collar 600 can have at least one conduit slot 608. In other examples, the collar 600 can have more than two conduit slots 608. The conduit slots 608*a*, 608*b* can be configured in a variety of different ways so as to accommodate a variety of different types of conduits. In some examples, when coupled together, the conduit slots 608*a*, 608*b* exert a clamping pressure on the conduit 601 positioned therein in order to retain the conduit 601 within the conduit slot 608.

Figure 31:
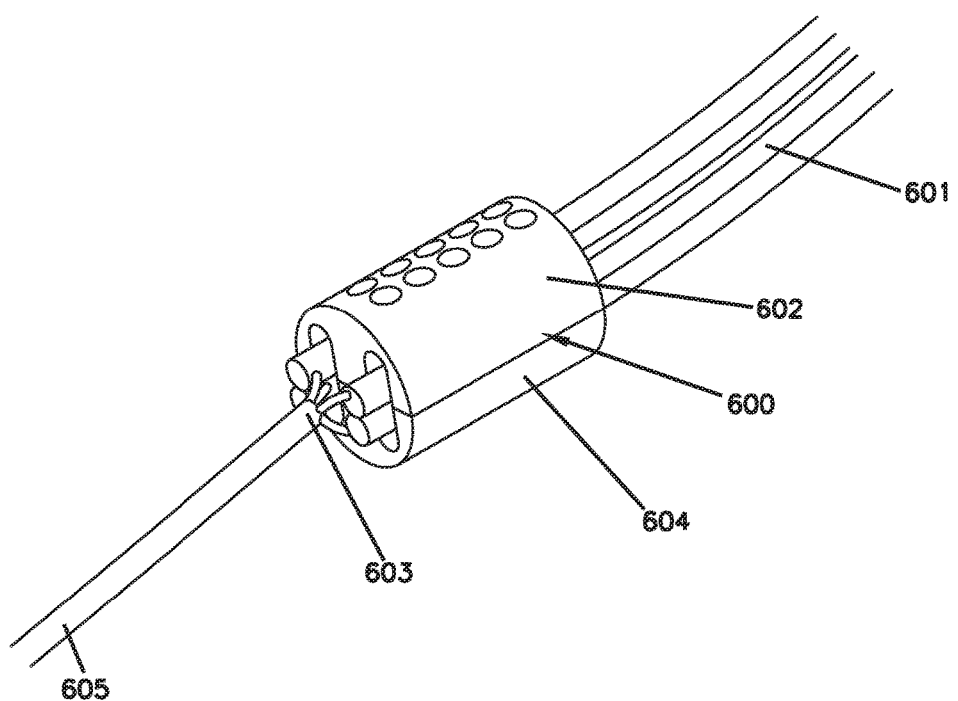
FIG. 31 illustrates a perspective view of the removable multiple pipe collar accessory of FIG. 28 used without a pullhead adapter.
Figure 32:
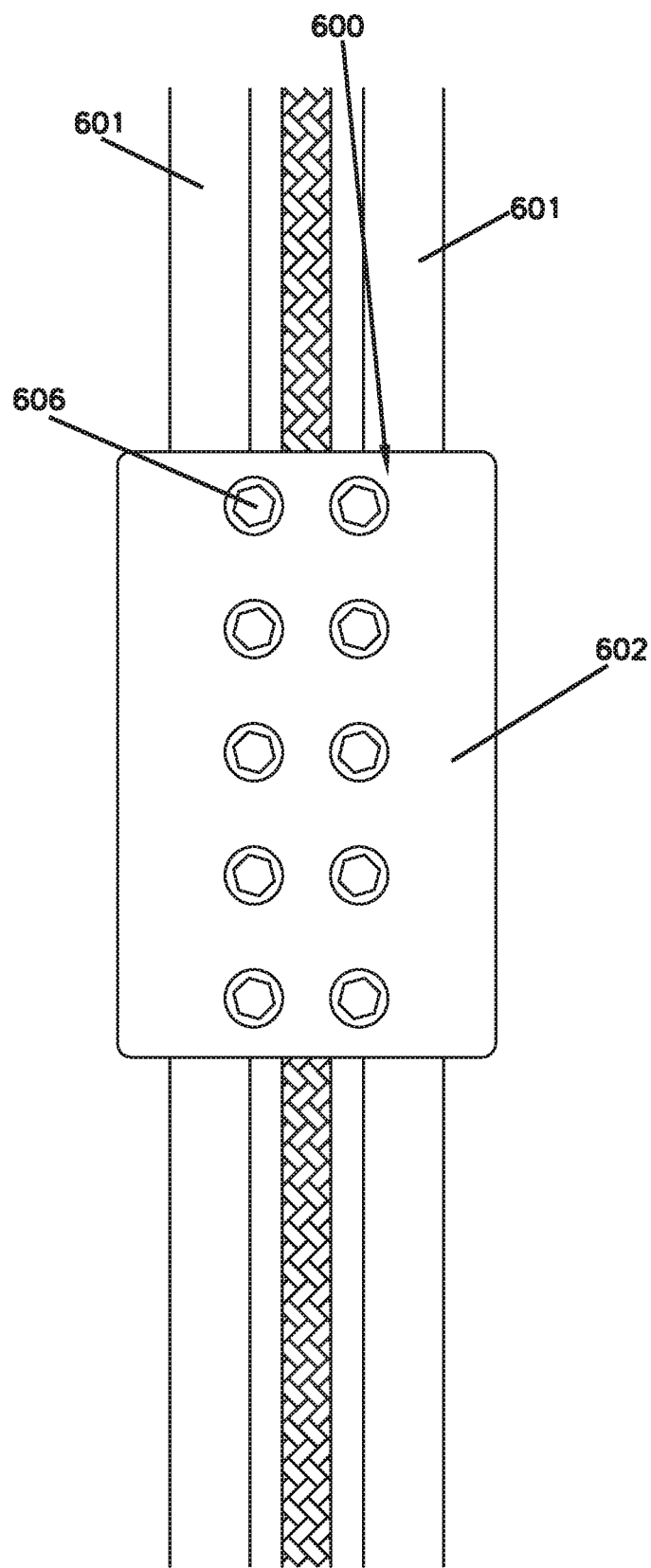
FIG. 32 illustrates a top view of the removable multiple pipe collar accessory of FIG. 28 used without a pullhead adapter.

As shown in FIGS. 31 and 32, collar 600 can be used on its own, without the pullhead 304. In such an example, the conduits 601 are secured to a pulling device 605, such as a cable, at a pulling end 603 of the collar 600. Because the collar 600 exerts a clamping on the conduit 601 within the conduit slots 608 of the collar 600, any force that is applied to any of the conduits 601 at the pulling end 603 is distributed in even amount over all conduits within the pulling collar 600. This results in a lower likelihood that the pulling device will damage one single conduit 601 (or stretch or break).

In some examples, as shown in FIG. 32, the collar 600 can be secured around other portions of the conduit 601 and not just at the pulling end 603. In such an example, the collar 600 helps to protect the conduit 601 when being pulled within a hole. In some examples, the collar 600 is configured to be pulled within an already installed conduit. The collar 600 can be sized and shaped to facilitate elevating the conduit 601 so as to prevent excess dragging of the conduit 601 either within a preinstalled conduit or within a drilled hole.

Figure 33:
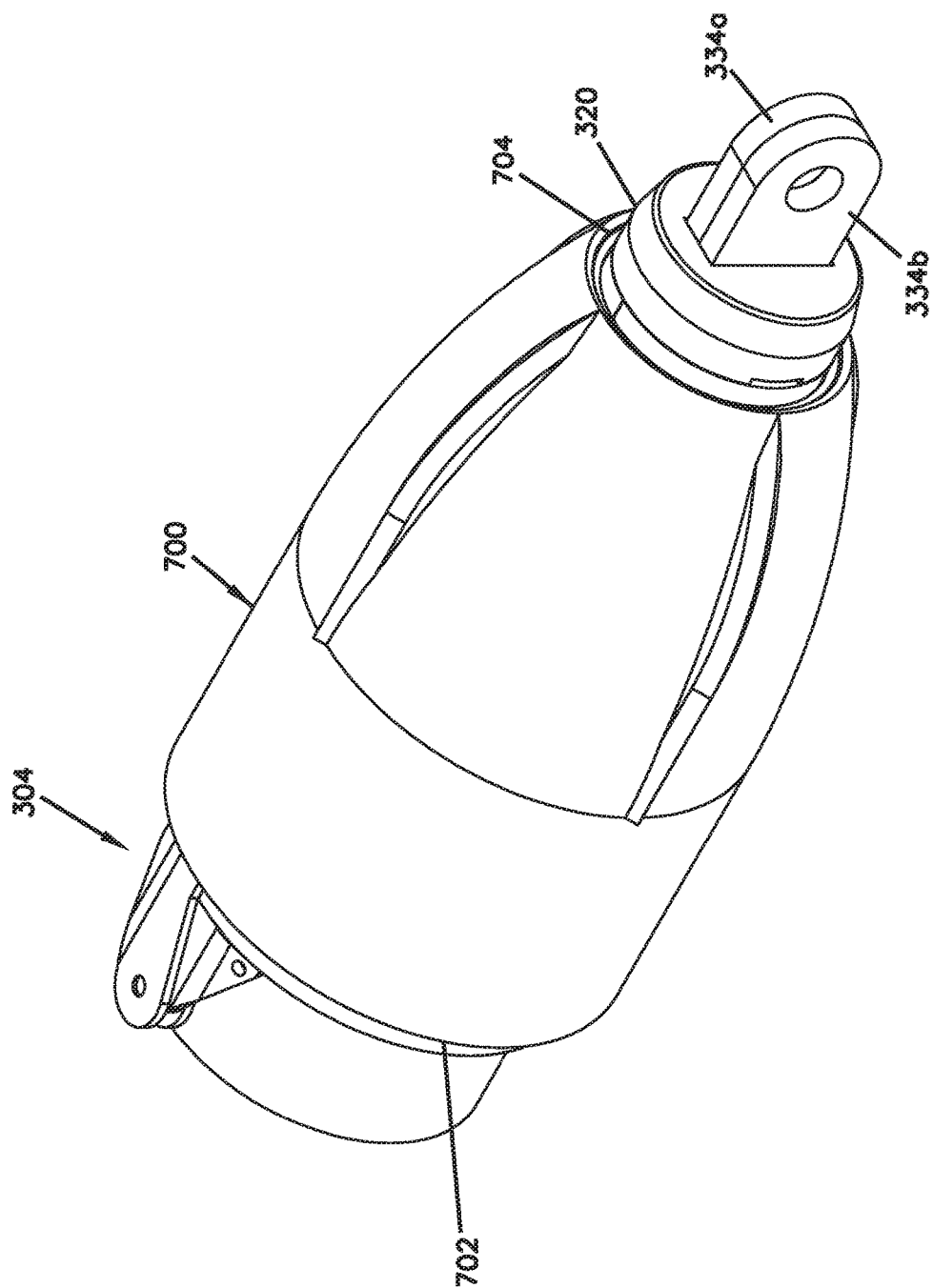
FIG. 33 illustrates a perspective view of a pipe bursting sleeve positioned around the pullhead adapter of FIG. 18, according to one embodiment of the present disclosure.

FIG. 33 shows a perspective view of the pullhead 304 with a pipe bursting sleeve 700 positioned thereover. FIG. 34 shows a perspective view of the pullhead 304 and pipe bursting sleeve 700 positioned in a separated relationship. In some examples, the pipe bursting sleeve 700 is configured to protect the pullhead 304 during a pipe bursting operation. In some examples, the pipe bursting sleeve 700 is further configured to effectively expand and burst pipe when positioned and pulled within a pipe.

Specifically, the pipe bursting sleeve 700 includes a first aperture 702 and a second aperture 704. In some examples, the second aperture 704 has a smaller width than the first aperture 702 and is configured to be positioned adjacent the retainer ring 320. In some examples, the pipe bursting sleeve 700 can be used in lieu of the retainer ring 320 during a normal pullback operation in order to couple the bodies 318*a*, 318*b* of the pullhead 304 together.

Figure 35:
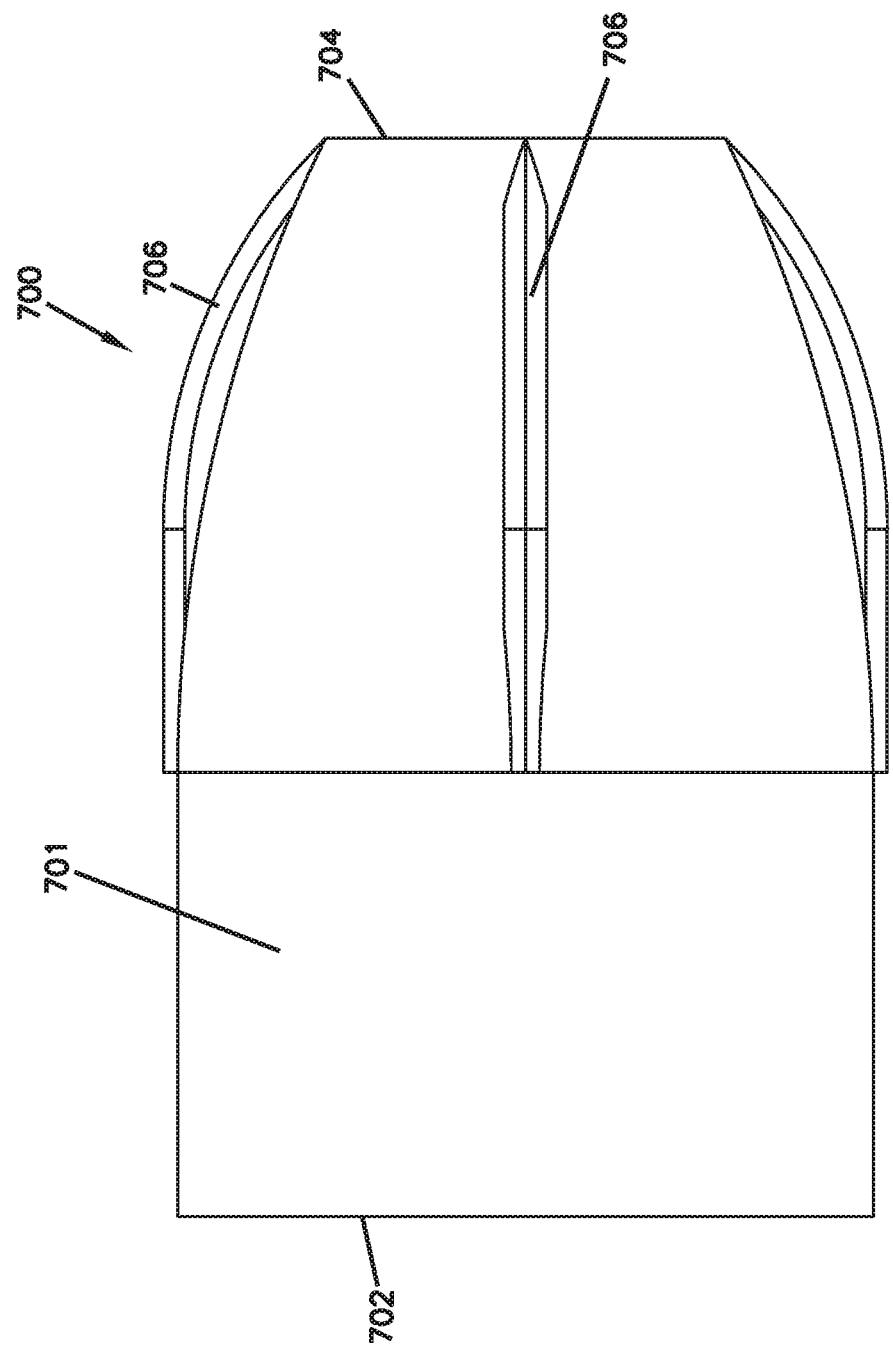
FIG. 35 illustrates a side view of the pipe bursting sleeve of FIG. 34.
Figure 36:
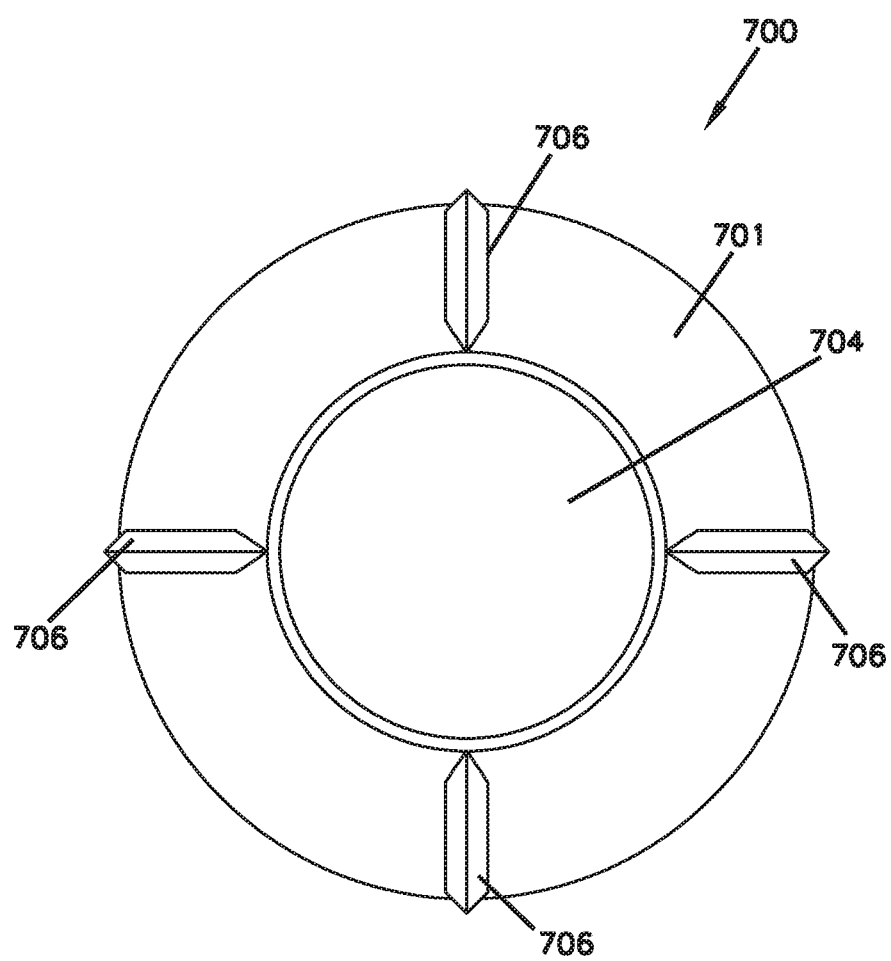
FIG. 36 illustrates a front view of the pipe bursting sleeve of FIG. 34.

FIGS. 35 and 36 show a side view and a front view of the pipe bursting sleeve 700, respectively. In some examples, the pipe bursting sleeve 700 includes fins 706 positioned on an exterior surface 701 of the pipe bursting sleeve 700. In some examples, the fins 706 are configured to interface with an interior of a pipe that is to be burst. In some examples, the fins 706 are replaceable. In other examples, the fins 706 are constructed from a material different from the material used to the construct the rest of pipe bursting sleeve 700. In other examples still, the fins 706 are equally spaced around the exterior surface 701.

Figure 37:
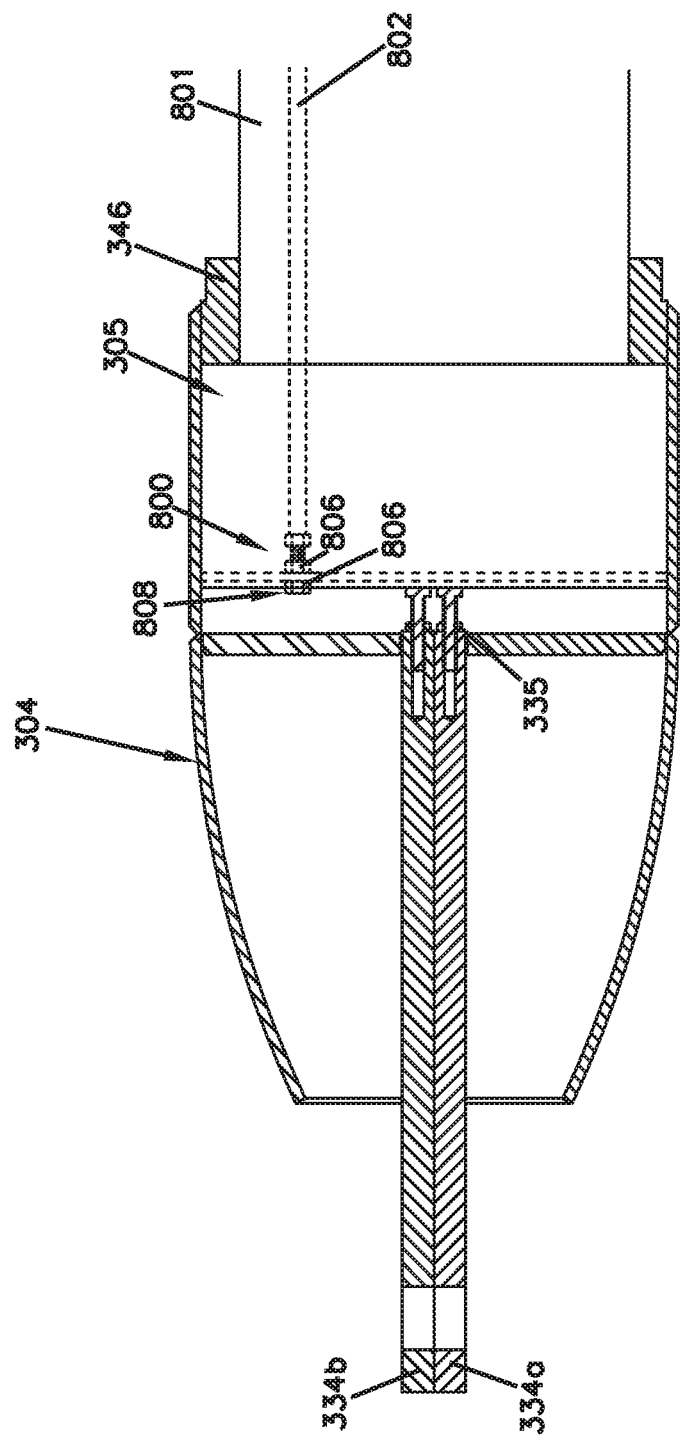
FIG. 37 illustrates a schematic cross sectional view of a pullback fluid fitting positioned within a pullhead accessory, according to one embodiment of the present disclosure.

FIGS. 37 and 38 depict an optional pullback fluid fitting 800 positioned within the pullhead 304. The pullback fluid fitting 800 is configured to deliver pullback fluid from above ground to the pullhead 304 underground during a pullback operation. The pullback fluid can be configured to lubricate the soil surrounding the pullhead 304 to ease pullback.

In FIG. 37, a generic accessory 305 is shown positioned within the interior pocket portion 342 of the pullhead 304. In some examples, the accessory 305 is one of the accessories 400, 500, 600 described above. The accessory 305 is shown positioned around a portion of a conduit 801. Further, the accessory 305 is shown to include the pullback fluid fitting 800 embedded within the accessory 305.

The pullback fluid fitting 800 is configured to attach to a hose 802. The hose 802 can be connected to a pullback fluid source (not shown) above ground and facilitate communication with the fluid source and the pullhead 304. In some examples, the pullback fluid fitting 800 is configured to route the hose 802 within the conduit 801.

In some examples, the pullback fluid fitting 800 is secured to the accessory by a pair of fasteners 806. In some examples, the pullback fluid fitting 800 is removable from the accessory 305. In other examples still, the pullback fluid fitting 800 can include a nozzle 808 to selectively deliver fluid within the pullhead 304.

FIG. 38 shows the adapter 303 and cap 350 with the pullback fluid fitting 800 installed within the cap 350 and the hose 802 shown in hidden lines. By including the pullback fluid fitting 800 in the cap 350, a generic adapter 303 can be utilized without having to modify the adapter 303. Referring to FIGS. 1-38 generally, it is recognized that a number of variants of the pullhead are possible, consistent with the present disclosure. For example, the pullhead can be manufactured in a variety of sizes to accommodate different sizes of conduit, or may alternatively (or in addition) include different sizes of flange included within the pullhead. Additionally, sub-adapters can be included that adjust the flange size (by engaging with the flange and forming a secondary flange of smaller width or diameter) to adjust for different adapter sizes. Furthermore, although discussed in terms of width and/or diameter, it is recognized that the adapter can have a non-circular cross section, such that $D_{FLANGE}$ and $D_{RING}$ (e.g., as seen in FIG. 6) may be non-constant; in such circumstances, it is preferable that at least $D_{FLANGE}$ be of a size larger than $D_{RING}$ for all possible diameter or width measurements of $D_{RING}$.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A pullhead comprising:
a housing having a first end and a second end, the housing being separable between a first body and a second body, wherein the first and second bodies are pivotally coupled at a joint, wherein the first and second bodies together define an interior pocket of the housing, the interior pocket having an interior pocket width;
a pulling feature at the first end; and
an interior retainer flange disposed within the interior pocket having an inner width, the inner width being less than the interior pocket width;
wherein the first body and second body are pivotable relative to each other around an axis at the joint that is transverse to a pulling direction.

2. The pullhead of claim 1, wherein the first and second bodies each define at least a portion of the interior retainer flange and at least a portion of the pulling feature.

3. The pullhead of claim 1, wherein the first and second bodies include pulling extensions, wherein the pulling extensions combine to form the pulling feature.

4. The pullhead of claim 3, further comprising a collar configured to be positioned around the pulling extensions of the first and second bodies simultaneously, wherein the collar couples the first and second bodies to one another.

5. The pullhead of claim 1, wherein the first and second bodies each include a pair of joint extensions, wherein the joint extensions of the first body are configured to mate with the joint extensions of the second body to form the joint.

6. The pullhead of claim 5, wherein at least one of the joint extensions of each of the first and second bodies includes a hook.

7. The pullhead of claim 6, wherein at least one of the joint extensions of each of the first and second bodies defines a hook receiving portion, the hook receiving portion having a hook receiving surface to receive the hook therearound.

8. The pullhead of claim 7, wherein the hook receiving surface is a pin.

9. The pullhead of claim 8, wherein the pin is fixed to the hook receiving portion.

10. The pullhead of claim 8, wherein the pin is separable from the hook receiving portion.

11. The pullhead of claim 6, wherein at least one of the joint extensions of each of the first and second bodies defines a hook receiving portion defined between at least two surfaces.

12. The pullhead of claim 11, wherein the two surfaces are a pair of plates, and the hook receiving portion comprises a through hole.

13. The pullhead of claim 1, further comprising an opening positioned at the second end of the housing, the opening being in communication with the interior pocket, wherein the joint is positioned adjacent the opening.

14. The pullhead of claim 1, wherein the inner width of the interior retainer flange is greater than a width across a conduit at the same position as the inner width.

15. A method for installing a pullhead at an end of a conduit comprising:
attaching an adapter to the end of the conduit, the adapter including a flange; and
installing a removable pullhead around the adapter, the pullhead including:
a housing having a first end and a second end, the housing being separable between a first body and a second body, wherein the first and second bodies are pivotable relative to each other around an axis at the joint that is transverse to a pulling direction of the pullhead, wherein the first and second bodies together define an interior pocket of the housing, the interior pocket having an interior pocket width;
a pulling feature at the first end;
an interior retainer flange disposed within the interior pocket having an inner width, the inner width being less than the interior pocket width, wherein the interior retainer flange corresponds with the flange on the adapter so as to allow the pullhead to pull the conduit in the axial pulling direction via the pulling feature.

16. The method of claim 15, further comprising pulling the conduit into an underground location and uncoupling the pullhead from the adapter.

17. The method of claim 15, further comprising securing the pullhead around the conduit using a collar, the collar being configured to interface with and couple the first and second bodies to one another.

18. The method of claim 17, further comprising pulling the conduit into an underground location and uncoupling the pullhead from the adapter by removing the collar.

19. The method of claim 17, wherein the first and second bodies include pulling extensions, wherein the pulling extensions combine to form the pulling feature and wherein the collar includes an aperture sized and shaped to be positioned around the pulling extensions of the first and second bodies simultaneously.

20. A pulling adapter comprising:
a housing having first and second ends, the housing being longitudinally separable between a first body and a second body, wherein the first and second bodies are pivotable relative to each other around an axis at the joint that is transverse to a pulling direction of the pulling adapter, wherein the first and second bodies together define an interior pocket of the housing, the interior pocket having an interior pocket width;
a pulling eye being positioned at the first end of the housing;
an opening positioned at the second end of the housing, the opening being in communication with the interior pocket, wherein the joint is positioned adjacent the opening; and
an interior retainer flange disposed within the interior pocket having an inner width, the inner width being less than the interior pocket width;
wherein the first and second bodies are pivotable about the joint between an open position and a closed position, wherein, when in the open position, the adapter is configured to receive a portion of conduit in the interior pocket, and wherein, when in the closed position, the adapter is configured to retain a portion of conduit within the interior pocket for a pulling operation.

21. The pulling adapter of claim 20, further comprising a cap and a gasket, wherein the cap and gasket are configured to be positioned at an end of the portion of conduit, the housing further including an extension that extends into the interior pocket, the extension being configured to interface with the cap when the first and second bodies are pivoted between the open position and the closed position.

22. The pulling adapter of claim 20, wherein the first and second bodies include at least one hook joint extension and at least one hook receiving portion, wherein the at least one hook receiving portion of the first body is configured to receive the at least one hook joint extension of the second body and the at least one hook receiving portion of the second body is configured to receive the at least one hook joint extension of the first body to form the joint.

* * * * *

UNITED STATES PATENT AND TRADEMARK OFFICE
CERTIFICATE OF CORRECTION

PATENT NO. : 10,274,106 B2
APPLICATION NO. : 15/693006
DATED : April 30, 2019
INVENTOR(S) : Baumgartner et al.

It is certified that error appears in the above-identified patent and that said Letters Patent is hereby corrected as shown below:

In the Specification

Column 10, Line 19: "devises, hooks, or other like devices" should read --clevises, hooks, or other like devices--

Signed and Sealed this
Tenth Day of September, 2019

Andrei Iancu
*Director of the United States Patent and Trademark Office*